United States Patent
Raghavan et al.

(10) Patent No.: US 6,758,785 B2
(45) Date of Patent: Jul. 6, 2004

(54) MULTI-SPEED TRANSMISSION WITH THREE PLANETARY GEARSETS AND INPUT CLUTCHES

(75) Inventors: Madhusudan Raghavan, West Bloomfield, MI (US); Patrick Benedict Usoro, Troy, MI (US); Norman Kenneth Bucknor, Troy, MI (US); Chunhao J. Lee, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/282,899

(22) Filed: Oct. 29, 2002

(65) Prior Publication Data

US 2004/0082423 A1 Apr. 29, 2004

(51) Int. Cl.[7] .................................................. F16H 3/62
(52) U.S. Cl. ...................... 475/276; 475/284; 475/286; 475/326
(58) Field of Search .................................. 475/276, 280, 475/282, 284, 286, 296, 314, 320, 326, 330

(56) References Cited

U.S. PATENT DOCUMENTS

| 4,004,473 A | * | 1/1977 | Pearce et al. ............ 475/276 X |
| 4,070,927 A | | 1/1978 | Polak ........................... 74/765 |
| 4,709,594 A | | 12/1987 | Maeda ......................... 74/753 |
| 5,106,352 A | | 4/1992 | Lepelletier .................. 475/280 |
| 5,599,251 A | | 2/1997 | Beim et al. .................. 475/275 |
| 5,879,263 A | * | 3/1999 | Haka ........................... 475/276 |
| 6,053,839 A | | 4/2000 | Baldwin et al. ............. 475/281 |
| 6,071,208 A | | 6/2000 | Koivunen .................... 475/275 |
| 6,083,135 A | | 7/2000 | Baldwin et al. ............. 475/276 |
| 6,217,474 B1 | | 4/2001 | Ross et al. .................. 475/269 |
| 6,425,841 B1 | * | 7/2002 | Haka ...................... 475/286 X |

FOREIGN PATENT DOCUMENTS

| JP | 402154846 | * 6/1990 | ................. 475/276 |
| JP | 9-126283 | 5/1997 | |

* cited by examiner

*Primary Examiner*—Ha Ho
(74) *Attorney, Agent, or Firm*—Kathryn A. Marra

(57) ABSTRACT

A family of power transmissions includes three planetary gearsets, which each have a member interconnected with one of the other planetary gearsets, and two of the planetary gearsets have a second member continuously interconnected. Each family member includes six torque-transmitting mechanisms which are engaged in combinations of two to establish at least seven forward speed ratios and one reverse speed ratio within the planetary gear arrangement between the transmission input shaft and the transmission output shaft.

4 Claims, 17 Drawing Sheets

|  | Ratios | 50 | 52 | 54 | 56 | 58 | 60 |
|---|---|---|---|---|---|---|---|
| Reverse | -3.92 |  |  | X |  |  | X |
| Neutral |  |  |  |  |  |  | X |
| 1 | 4.60 |  | X |  |  |  | X |
| 2 | 2.42 |  | X |  |  | X |  |
| 3 | 1.55 |  | X |  | X |  |  |
| 4 | 1.00 | X | X |  |  |  |  |
| 5 | 0.85 | X |  |  | X |  |  |
| 6 | 0.72 | X |  | X |  |  |  |
| 7 | 0.61 | X |  |  |  | X |  |

(X = engaged)

Ring Gear/Sun Gear Tooth Ratio: $\frac{R_1}{S_1}=1.54, \frac{R_2}{S_2}=2.99, \frac{R_3}{S_3}=1.54$

| Ratio Spread | 7.58 |
|---|---|
| Ratio Steps |  |
| Rev/1 | -0.85 |
| 1/2 | 1.90 |
| 2/3 | 1.56 |
| 3/4 | 1.55 |
| 4/5 | 1.18 |
| 5/6 | 1.18 |
| 6/7 | 1.18 |

| | Ratios | 150 | 152 | 154 | 156 | 158 | 160 |
|---|---|---|---|---|---|---|---|
| Reverse | -3.92 | | | X | | | X |
| Neutral | | | | | | | X |
| 1 | 3.85 | | X | | | | X |
| 2 | 2.12 | | X | | | X | |
| 3 | 1.47 | | X | | X | | |
| 4 | 1.00 | X | X | | | | |
| 5 | 0.83 | X | | | X | | |
| 6 | 0.72 | X | | X | | | |
| 7 | 0.61 | X | | | | X | |

(X = engaged)

Ring Gear/Sun Gear Tooth Ratio: $\frac{R_1}{S_1}=2.50, \frac{R_2}{S_2}=1.54, \frac{R_3}{S_3}=1.54$

| Ratio Spread | 6.35 |
|---|---|
| Ratio Steps | |
| Rev/1 | -1.02 |
| 1/2 | 1.81 |
| 2/3 | 1.44 |
| 3/4 | 1.47 |
| 4/5 | 1.20 |
| 5/6 | 1.16 |
| 6/7 | 1.18 |

| | Ratios | 250 | 252 | 254 | 256 | 258 | 260 |
|---|---|---|---|---|---|---|---|
| Reverse | -3.92 | | | X | | X | |
| Neutral | | | | | | X | |
| 1 | 3.85 | | X | | | X | |
| 2 | 2.12 | | X | | | | X |
| 3 | 1.47 | | X | | X | | |
| 4 | 1.00 | X | X | | | | |
| 5 | 0.83 | X | | | X | | |
| 6 | 0.72 | X | | X | | | |
| 7 | 0.61 | X | | | | | X |

(X = engaged)

Ring Gear/Sun Gear Tooth Ratio: $\frac{R_1}{S_1} = 2.50, \frac{R_2}{S_2} = 1.54, \frac{R_3}{S_3} = 1.54$

| Ratio Spread | 6.35 |
|---|---|
| Ratio Steps | |
| Rev/1 | -1.02 |
| 1/2 | 1.81 |
| 2/3 | 1.44 |
| 3/4 | 1.47 |
| 4/5 | 1.20 |
| 5/6 | 1.16 |
| 6/7 | 1.18 |

| | Ratios | 350 | 352 | 354 | 356 | 358 | 360 |
|---|---|---|---|---|---|---|---|
| Reverse | -3.92 | | | X | | | X |
| Neutral | | | | | | | X |
| 1 | 3.85 | | X | | | | X |
| 2 | 2.12 | | X | | X | | |
| 3 | 1.47 | | X | | | X | |
| 4 | 1.00 | X | X | | | | |
| 5 | 0.83 | X | | | | X | |
| 6 | 0.72 | X | | | X | | |
| 7 | 0.61 | X | | | | X | |

(X = engaged)

Ring Gear/Sun Gear Tooth Ratio: $\frac{R_1}{S_1} = 2.50, \frac{R_2}{S_2} = 1.54, \frac{R_3}{S_3} = 1.54$

| Ratio Spread | 6.35 |
|---|---|
| Ratio Steps | |
| Rev/1 | -1.02 |
| 1/2 | 1.81 |
| 2/3 | 1.44 |
| 3/4 | 1.47 |
| 4/5 | 1.20 |
| 5/6 | 1.16 |
| 6/7 | 1.18 |

| | Ratios | 450 | 452 | 454 | 456 | 458 | 460 |
|---|---|---|---|---|---|---|---|
| Reverse | -3.02 | | | X | | | X |
| Neutral | | | | | | | X |
| 1 | 3.45 | | X | | | | X |
| 2 | 1.87 | | X | | | X | |
| 3 | 1.22 | | X | | X | | |
| 4 | 1.00 | X | X | | | | |
| 5 | 0.91 | X | | | X | | |
| 6 | 0.82 | X | | X | | | |
| 7 | 0.65 | X | | | | X | |

(X = engaged)

Ring Gear/Sun Gear Tooth Ratio: $\frac{R_1}{S_1}=1.83, \frac{R_2}{S_2}=1.89, \frac{R_3}{S_3}=1.53$

| Ratio Spread | 5.34 |
|---|---|
| Ratio Steps | |
| Rev/1 | -0.88 |
| 1/2 | 1.85 |
| 2/3 | 1.52 |
| 3/4 | 1.22 |
| 4/5 | 1.10 |
| 5/6 | 1.10 |
| 6/7 | 1.27 |

| | Ratios | 550 | 552 | 554 | 556 | 558 | 560 |
|---|---|---|---|---|---|---|---|
| Reverse | -3.02 | | | X | | | X |
| Neutral | | | | | | | X |
| 1 | 3.45 | | X | | | | X |
| 2 | 1.87 | | X | | X | | |
| 3 | 1.22 | | X | | | X | |
| 4 | 1.00 | X | X | | | | |
| 5 | 0.91 | X | | | | X | |
| 6 | 0.82 | X | | X | | | |
| 7 | 0.65 | X | | | | X | |

(X = engaged)

Ring Gear/Sun Gear Tooth Ratio: $\frac{R_1}{S_1}=1.83, \frac{R_2}{S_2}=1.89, \frac{R_3}{S_3}=1.53$

| Ratio Spread | 5.34 |
|---|---|
| Ratio Steps | |
| Rev/1 | -0.88 |
| 1/2 | 1.85 |
| 2/3 | 1.52 |
| 3/4 | 1.22 |
| 4/5 | 1.10 |
| 5/6 | 1.10 |
| 6/7 | 1.27 |

| | Ratios | 650 | 652 | 654 | 656 | 658 | 660 |
|---|---|---|---|---|---|---|---|
| Reverse | -3.02 | | | X | | | X |
| Neutral | | | | | | | X |
| 1 | 3.94 | | X | | | | X |
| 2 | 2.04 | | X | | | X | |
| 3 | 1.52 | | X | | X | | |
| 4 | 1.25 | | X | X | | | |
| 5 | 1.00 | X | X | | | | |
| 6 | 0.82 | X | | | X | | |
| 7 | 0.65 | X | | | | X | |

(X = engaged)

Ring Gear/Sun Gear Tooth Ratio: $\frac{R_1}{S_1}=1.83, \frac{R_2}{S_2}=2.15, \frac{R_3}{S_3}=1.53$

| Ratio Spread | 6.09 |
|---|---|
| Ratio Steps | |
| Rev/1 | -0.77 |
| 1/2 | 1.93 |
| 2/3 | 1.34 |
| 3/4 | 1.22 |
| 4/5 | 1.25 |
| 5/6 | 1.22 |
| 6/7 | 1.27 |

| | Ratios | 750 | 752 | 754 | 756 | 758 | 760 |
|---|---|---|---|---|---|---|---|
| Reverse | -2.55 | | | X | | | X |
| Neutral | | | | | | | X |
| 1 | 3.85 | | X | | | | X |
| 2 | 2.12 | | X | | X | | |
| 3 | 1.58 | | X | | | X | |
| 4 | 1.26 | | X | X | | | |
| 5 | 1.00 | X | X | | | | |
| 6 | 0.80 | X | | | X | | |
| 7 | 0.61 | X | | | | X | |

(X = engaged)

Ring Gear/Sun Gear Tooth Ratio: $\frac{R_1}{S_1} = 2.50, \frac{R_2}{S_2} = 1.54, \frac{R_3}{S_3} = 1.53$

| Ratio Spread | 6.35 |
|---|---|
| Ratio Steps | |
| Rev/1 | -0.66 |
| 1/2 | 1.81 |
| 2/3 | 1.34 |
| 3/4 | 1.25 |
| 4/5 | 1.26 |
| 5/6 | 1.26 |
| 6/7 | 1.31 |

| | Ratios | 850 | 852 | 854 | 856 | 858 | 860 |
|---|---|---|---|---|---|---|---|
| Reverse | -2.12 | X | | | | X | |
| Neutral | | | | | | X | |
| 1 | 5.23 | | | | X | X | |
| 2 | 3.21 | | | X | | X | |
| 3 | 2.40 | | | X | X | | |
| 4 | 1.71 | | | X | | | X |
| 5 | 1.00 | | X | X | | | |
| 6 | 0.68 | | X | | | | X |
| 7 | 0.60 | | X | | X | | |

(X = engaged)

Ring Gear/Sun Gear Tooth Ratio: $\frac{R_1}{S_1}=2.12, \frac{R_2}{S_2}=1.52, \frac{R_3}{S_3}=2.47$

| Ratio Spread | 8.70 |
|---|---|
| Ratio Steps | |
| Rev/1 | -0.41 |
| 1/2 | 1.63 |
| 2/3 | 1.34 |
| 3/4 | 1.40 |
| 4/5 | 1.71 |
| 5/6 | 1.47 |
| 6/7 | 1.13 |

| | Ratios | 950 | 952 | 954 | 956 | 958 | 960 |
|---|---|---|---|---|---|---|---|
| Reverse | -2.12 | X | | | | | X |
| Neutral | | | | | | | X |
| 1 | 5.23 | | | | X | | X |
| 2 | 3.21 | | | X | | | X |
| 3 | 2.40 | | | X | X | | |
| 4 | 1.71 | | | X | | X | |
| 5 | 1.00 | | X | X | | | |
| 6 | 0.68 | | X | | | X | |
| 7 | 0.60 | | X | | X | | |

(X = engaged)

Ring Gear/Sun Gear Tooth Ratio: $\frac{R_1}{S_1}=2.12, \frac{R_2}{S_2}=1.52, \frac{R_3}{S_3}=2.47$

| Ratio Spread | 8.70 |
|---|---|
| Ratio Steps | |
| Rev/1 | -0.41 |
| 1/2 | 1.63 |
| 2/3 | 1.34 |
| 3/4 | 1.40 |
| 4/5 | 1.71 |
| 5/6 | 1.47 |
| 6/7 | 1.13 |

| | Ratios | 1050 | 1052 | 1054 | 1056 | 1058 | 1060 |
|---|---|---|---|---|---|---|---|
| Reverse | -2.12 | X | | | | | X |
| Neutral | | | | | | | X |
| 1 | 5.23 | | | | X | | X |
| 2 | 3.21 | | | X | | | X |
| 3 | 2.40 | | | X | X | | |
| 4 | 1.71 | | | X | | X | |
| 5 | 1.00 | | X | X | | | |
| 6 | 0.68 | | X | | | X | |
| 7 | 0.60 | | X | | X | | |

(X = engaged)

Ring Gear/Sun Gear Tooth Ratio: $\frac{R_1}{S_1}=2.52, \frac{R_2}{S_2}=2.12, \frac{R_3}{S_3}=2.47$

| Ratio Spread | 8.70 |
|---|---|
| Ratio Steps | |
| Rev/1 | -0.41 |
| 1/2 | 1.63 |
| 2/3 | 1.34 |
| 3/4 | 1.40 |
| 4/5 | 1.71 |
| 5/6 | 1.47 |
| 6/7 | 1.13 |

| | Ratios | 1150 | 1152 | 1154 | 1156 | 1158 | 1160 |
|---|---|---|---|---|---|---|---|
| Reverse | -2.94 | | | X | X | | |
| Neutral | | | | X | | | |
| 1 | 5.38 | | | X | | | X |
| 2 | 2.77 | | X | | | | X |
| 3 | 2.07 | | X | X | | | |
| 4 | 1.63 | | X | | | X | |
| 5 | 1.00 | X | X | | | | |
| 6 | 0.65 | X | | | | X | |
| 7 | 0.58 | X | | X | | | |

(X = engaged)

Ring Gear/Sun Gear Tooth Ratio: $\frac{R_1}{S_1}=1.83, \frac{R_2}{S_2}=1.52, \frac{R_3}{S_3}=2.94$

| Ratio Spread | 9.32 |
|---|---|
| Ratio Steps | |
| Rev/1 | -0.55 |
| 1/2 | 1.94 |
| 2/3 | 1.34 |
| 3/4 | 1.27 |
| 4/5 | 1.63 |
| 5/6 | 1.55 |
| 6/7 | 1.12 |

| | Ratios | 1250 | 1252 | 1254 | 1256 | 1258 | 1260 |
|---|---|---|---|---|---|---|---|
| Reverse | -2.94 | | | X | X | | |
| Neutral | | | | X | | | |
| 1 | 5.38 | | | X | | X | |
| 2 | 2.77 | | X | | | X | |
| 3 | 2.07 | | X | X | | | |
| 4 | 1.63 | | X | | | | X |
| 5 | 1.00 | X | X | | | | |
| 6 | 0.65 | X | | | | | X |
| 7 | 0.58 | X | | X | | | |

(X = engaged)

Ring Gear/Sun Gear Tooth Ratio: $\frac{R_1}{S_1}=1.52, \frac{R_2}{S_2}=1.83, \frac{R_3}{S_3}=2.94$

| Ratio Spread | 9.32 |
|---|---|
| Ratio Steps | |
| Rev/1 | -0.55 |
| 1/2 | 1.94 |
| 2/3 | 1.34 |
| 3/4 | 1.27 |
| 4/5 | 1.63 |
| 5/6 | 1.55 |
| 6/7 | 1.12 |

| | Ratios | 1350 | 1352 | 1354 | 1356 | 1358 | 1360 |
|---|---|---|---|---|---|---|---|
| Reverse | -2.94 | | | X | | X | |
| Neutral | | | | X | | | |
| 1 | 5.38 | | | X | | | X |
| 2 | 2.77 | | X | | | | X |
| 3 | 2.07 | | X | X | | | |
| 4 | 1.63 | | X | | X | | |
| 5 | 1.00 | X | X | | | | |
| 6 | 0.65 | X | | | X | | |
| 7 | 0.58 | X | | X | | | |

(X = engaged)

Ring Gear/Sun Gear Tooth Ratio: $\frac{R_1}{S_1}=1.83, \frac{R_2}{S_2}=1.52, \frac{R_3}{S_3}=2.94$

| Ratio Spread | 9.32 |
|---|---|
| Ratio Steps | |
| Rev/1 | -0.55 |
| 1/2 | 1.94 |
| 2/3 | 1.34 |
| 3/4 | 1.27 |
| 4/5 | 1.63 |
| 5/6 | 1.55 |
| 6/7 | 1.12 |

|  | Ratios | 1450 | 1452 | 1454 | 1456 | 1458 | 1460 |
|---|---|---|---|---|---|---|---|
| Reverse | -3.90 |  |  | X |  |  | X |
| Neutral |  |  |  | X |  |  |  |
| 1 | 3.12 |  |  | X | X |  |  |
| 2 | 2.10 | X |  |  | X |  |  |
| 3 | 1.43 |  | X |  | X |  |  |
| 4 | 1.00 | X | X |  |  |  |  |
| 5 | 0.90 |  | X |  |  | X |  |
| 6 | 0.75 | X |  |  |  | X |  |
| 7 | 0.51 |  |  | X |  | X |  |

(X = engaged)

Ring Gear/Sun Gear Tooth Ratio: $\frac{R_1}{S_1}=1.54, \frac{R_2}{S_2}=1.53, \frac{R_3}{S_3}=2.15$

| Ratio Spread | 6.13 |
|---|---|
| Ratio Steps |  |
| Rev/1 | -1.25 |
| 1/2 | 1.49 |
| 2/3 | 1.47 |
| 3/4 | 1.43 |
| 4/5 | 1.11 |
| 5/6 | 1.21 |
| 6/7 | 1.47 |

| | Ratios | 1550 | 1552 | 1554 | 1556 | 1558 | 1560 |
|---|---|---|---|---|---|---|---|
| Reverse | -3.88 | | | X | | | X |
| Neutral | | | | X | | | |
| 1 | 4.22 | | | X | X | | |
| 2 | 2.68 | | X | | X | | |
| 3 | 1.66 | X | | | X | | |
| 4 | 1.00 | X | X | | | | |
| 5 | 0.91 | X | | | | X | |
| 6 | 0.76 | | X | | | X | |
| 7 | 0.55 | | | X | | X | |

(X = engaged)

Ring Gear/Sun Gear Tooth Ratio: $\frac{R_1}{S_1}=1.54, \frac{R_2}{S_2}=1.52, \frac{R_3}{S_3}=1.52$

| Ratio Spread | 7.73 |
|---|---|
| Ratio Steps | |
| Rev/1 | -0.92 |
| 1/2 | 1.58 |
| 2/3 | 1.61 |
| 3/4 | 1.66 |
| 4/5 | 1.10 |
| 5/6 | 1.19 |
| 6/7 | 1.40 |

| | Ratios | 1650 | 1652 | 1654 | 1656 | 1658 | 1660 |
|---|---|---|---|---|---|---|---|
| Reverse | -3.88 | | | X | X | | |
| Neutral | | | | X | | | |
| 1 | 4.22 | | | X | | X | |
| 2 | 2.68 | | X | | | X | |
| 3 | 1.66 | X | | | | X | |
| 4 | 1.00 | X | X | | | | |
| 5 | 0.91 | X | | | | | X |
| 6 | 0.76 | | X | | | | X |
| 7 | 0.55 | | | X | | | X |

(X = engaged)

Ring Gear/Sun Gear Tooth Ratio: $\frac{R_1}{S_1}=1.54, \frac{R_2}{S_2}=1.52, \frac{R_3}{S_3}=1.52$

| Ratio Spread | 7.73 |
|---|---|
| Ratio Steps | |
| Rev/1 | -0.92 |
| 1/2 | 1.58 |
| 2/3 | 1.61 |
| 3/4 | 1.66 |
| 4/5 | 1.10 |
| 5/6 | 1.19 |
| 6/7 | 1.40 |

MULTI-SPEED TRANSMISSION WITH THREE PLANETARY GEARSETS AND INPUT CLUTCHES

TECHNICAL FIELD

This invention relates to power transmissions and, more particularly, to multi-speed power transmissions having three planetary gearsets and six torque-transmitting mechanisms for providing at least seven forward speed ratios.

BACKGROUND OF THE INVENTION

Automatic shifting power transmissions are currently used in a majority of the vehicles produced in the United States. These vehicles generally employ three- and four-speed power transmissions. More recently, a trend towards more ratios, such as five- and six-speed power transmissions, has been proposed. In fact, some manufacturers do provide five-speed transmissions. Many of the vehicles utilizing manual type transmissions or countershaft type transmissions employ five- and six-speed power transmissions.

The five- and six-speed power transmissions provide improved vehicle acceleration performance and fuel economy when compared with three- and four-speed transmissions. There are many current patents that describe five- and six-speed power transmissions. Some of the six-speed power transmission patents, especially those assigned to the assignee of the present invention, describe six-speed power transmissions in families, wherein one or more family members incorporate a seven-speed power transmission. However, seven-speed power transmissions have not been proposed due to the complexity of these assemblies, as well as size and cost.

SUMMARY OF THE INVENTION

It is an object of the present invention to provide an improved family of power transmissions having three planetary gearsets and six torque-transmitting mechanisms.

In one aspect of the present invention, each of the planetary gearsets has three members including a sun gear member, a ring gear member, and a planet carrier assembly member.

In another aspect of the present invention, a first member of the first planetary gearset is continuously interconnected with a first member of the second planetary gearset and a first member of the third planetary gearset.

In yet another aspect of the present invention, a second interconnecting member continuously interconnects a second member of the first planetary gearset with a second member of the second planetary gearset.

In still another aspect of the present invention, a second member of the third planetary gearset is continuously interconnected with a stationary housing member.

In yet still another aspect of the present invention, a transmission output shaft is continuously connected with at least one member of one of the planetary gearsets.

In yet another aspect of the present invention, the transmission input shaft is not continuously connected with any member of the planetary gearsets.

In yet another aspect of the present invention, a first of the torque-transmitting mechanisms selectively interconnects the input shaft of the transmission with at least one member of one of the planetary gearsets.

In a further aspect of the present invention, a second of the torque-transmitting mechanisms selectively interconnects the transmission input shaft with at least one member of one of the planetary gearsets or with one of the interconnecting members.

In a yet further aspect of the present invention, a third of the torque-transmitting mechanisms selectively interconnects the input shaft of the transmission with at least one member of one of the planetary gearsets or one of the interconnecting members not otherwise interconnected with the second torque-transmitting mechanism.

In a still further aspect of the present invention, a fourth of the torque-transmitting mechanisms selectively interconnects at least one member of one of the planetary gearsets with either the input shaft, the output shaft, or another member of one of the planetary gearsets.

In a yet still further aspect of the present invention, a fifth of the torque-transmitting mechanisms selectively interconnects at least one member of one of the planetary gearsets with either another member of one of the planetary gearsets or with the transmission housing.

In another aspect of the present invention a sixth of the torque-transmitting mechanisms selectively interconnects a member of one of the planetary gearsets with either the output shaft, another member of one of the planetary gearsets, or with the transmission housing.

In still another aspect of the present invention, the six torque-transmitting mechanisms are selectively engageable in combinations of two to establish at least seven forward speed ratios and one reverse speed ratio between the input shaft and the output shaft of the transmission.

DESCRIPTION OF THE EXEMPLARY EMBODIMENTS

Figures 1, 2:
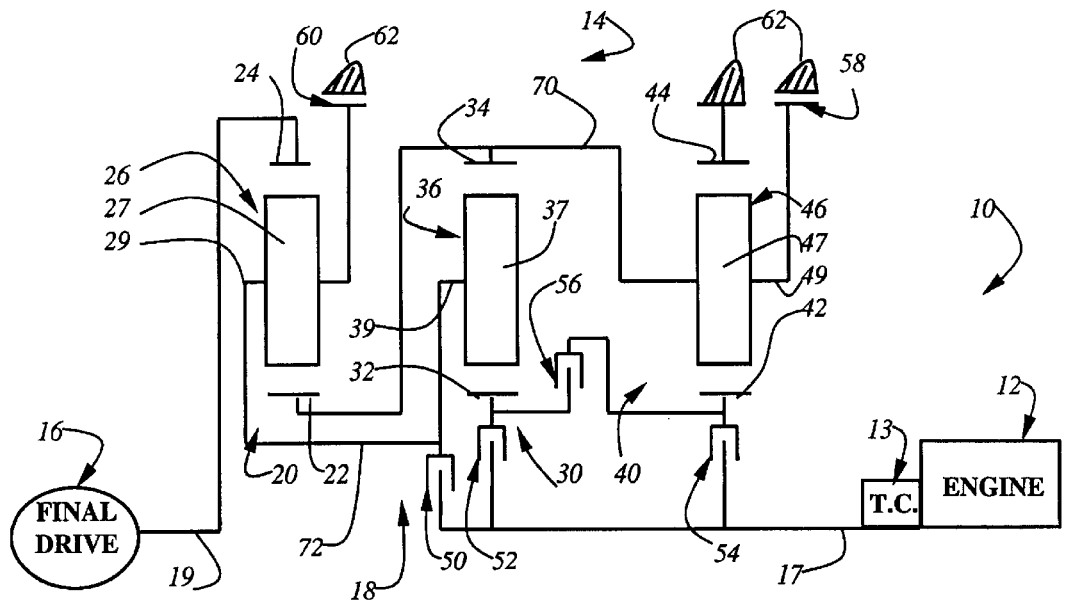
FIG. 1 is a schematic representation of a powertrain having a planetary transmission incorporating one embodiment of the present invention.
FIG. 2 is truth table and chart providing information regarding some of the operating parameters of the power transmission shown in FIG. 1.

Referring to the drawings, wherein like characters represent the same or corresponding parts throughout the several views, there is seen in FIG. 1 a powertrain 10 having a conventional engine or prime mover 12, a conventional starting device 13, such as a torque converter, a planetary transmission 14, and a conventional final drive mechanism 16. The final drive mechanism 16 is connected in a conventional manner with the drive wheels of a vehicle, not shown. The planetary transmission 14 includes an input shaft 17, which is continuously interconnected with the starting mechanism 13 and engine 12, a planetary gear arrangement 18, and an output shaft 19, which is continuously interconnected with the final drive mechanism 16.

The planetary gear arrangement 18 has a planetary gearset 20, which includes a sun gear member 22, a ring gear member 24, and a planet carrier assembly member 26. The planet carrier assembly member 26 includes a plurality of pinion gear members 27 rotatably mounted on a planet carrier member 29, and disposed in meshing relationship with both the sun gear member 22 and the ring gear member 24. The planet carrier assembly member 26 is a single pinion planetary gearset which means that a plurality of pinion gear members 27 are distributed substantially equiangularly about the planet carrier member 29 to balance the torque forces which are transmitted through the planetary gearset.

The planetary gear arrangement 18 also includes a planetary gearset 30, which includes a sun gear member 32, a ring gear member 34, and a planet carrier assembly member 36. The planet carrier assembly member 36 includes a plurality of pinion gear members 37 rotatably mounted on a planet carrier member 39, and disposed in meshing relationship with both the sun gear member 32 and the ring gear member 34. The planetary gearset 30 is a single pinion type planetary gearset.

The planetary gear arrangement 18 further includes a planetary gearset 40, which includes a sun gear member 42, a ring gear member 44, and a planet carrier assembly member 46. The planet carrier assembly member 46 is a single pinion type planet carrier assembly member having a plurality of pinion gear members 47 rotatably mounted on a planet carrier member 49, and disposed in meshing relationship with both the sun gear member 42 and the ring gear member 44.

The planetary gear arrangement 18 includes four rotating type torque-transmitting mechanisms 50, 52, 54, and 56 and two stationary type torque-transmitting mechanisms 58 and 60. The rotating type torque-transmitting mechanisms are commonly termed clutches and provide a rotary drive connection between two or more members of the planetary transmission 14. The stationary type torque-transmitting mechanisms 58 and 60 are conventional fluid-operated brake mechanisms, which may be either of the band type or disc type. The stationary type torque-transmitting mechanisms provide torque-transmitting connections between the respective members of the planetary gear arrangement 18 and a transmission housing 62.

The sun gear member 22, the ring gear member 34, and planet carrier assembly member 46 are continuously interconnected by an interconnecting member 70. The planet carrier assembly member 26 and planet carrier assembly member 36 are continuously interconnected by an interconnecting member 72. The ring gear member 44 is continuously connected with the transmission housing 62. The ring gear member 24 is continuously interconnected with the transmission output shaft 19.

The input shaft 17 is selectively interconnectible with the interconnecting member 72 through the torque-transmitting mechanism 50, selectively interconnectible with the sun gear member 32 through the torque-transmitting mechanism 52, and selectively interconnectible with the sun gear member 42 through the torque-transmitting mechanism 54. The sun gear members 32 and 42 are selectively interconnectible through the torque-transmitting mechanism 56. The interconnecting member 70, and therefore the planetary members connected therewith, is selectively interconnectible with the transmission housing 62 through the torque-transmitting mechanism 58. The interconnecting member 72 and therefore the planetary members connected therewith, is selectively interconnectible with the transmission housing 62 through the torque-transmitting mechanism 60.

As seen in the truth table of FIG. 2, the torque-transmitting mechanisms are selectively engaged in combinations of two to establish seven forward speed ratios and one reverse speed ratio between the input shaft 17 and the output shaft 19. The truth table of FIG. 2 also provides a numerical example of the speed ratios that are available with the planetary transmission 14. The numerical values of these speed ratios is determined from the ring gear/sun gear tooth ratios of the planetary gearsets 20, 30, and 40, which are represented by R1/S1, R2/S2, and R3/S3, respectively. Also given in FIG. 2 is a chart providing the numerical values for the ratio steps between adjacent forward speed ratios as well as between the reverse and first forward speed ratio that are present when the speed ratios given in the truth table are employed. The overall ratio spread of the forward speed ratios is also provided in the chart of FIG. 2.

The reverse speed ratio is established with the engagement of the torque-transmitting mechanisms 54 and 60. During the reverse speed ratio, the planet carrier assembly member 46, ring gear member 34, and sun gear member 22 are rotated at a speed determined by the speed of the sun gear member 42 and the ring gear/sun gear tooth ratio of the planetary gearset 40. The ring gear member 24 and therefore output shaft 19 are rotated at a speed determined by the speed of the sun gear member 22 and the ring gear/sun gear tooth ratio of the planetary gearset 20. The numerical value of the reverse speed ratio is determined by the ring gear/sun gear tooth ratios of the planetary gearsets 20 and 40.

The first forward speed ratio is established with the engagement of the torque-transmitting mechanisms 52 and 60. During the first forward speed ratio, the ring gear member 34 and sun gear member 22 are rotated at a speed determined by the speed of the sun gear member 32 and the ring gear/sun gear tooth ratio of the planetary gearset 30. The ring gear member 24 and therefore output shaft 19 are rotated at a speed determined by the speed of the sun gear member 22 and the ring gear/sun gear tooth ratio of the planetary gearset 20. The numerical value of the first forward speed ratio is determined by the ring gear/sun gear tooth ratios of planetary gearsets 20 and 30.

The second forward speed ratio is established with the engagement of the torque-transmitting mechanisms 52 and 58. During the second forward speed ratio, the planet carrier assembly members 36 and 26 are rotated at a speed determined by the speed of the sun gear member 32 and the ring gear/sun gear tooth ratio of the planetary gearset 30. The ring gear member 24 and therefore output shaft 19 are rotated at a speed determined by the speed of the planet carrier assembly member 26 and the ring gear/sun gear tooth ratio of the planetary gearset 20. The numerical value of the second forward speed ratio is determined by the ring gear/sun gear tooth ratios of the planetary gearsets 20 and 30.

The third forward speed ratio is established with the engagement of the torque-transmitting mechanisms 52 and 56. During the third forward speed ratio, the planet carrier assembly member 46, ring gear member 34, and sun gear member 22 are rotated at a speed determined by the speed of the sun gear member 42 and the ring gear/sun gear tooth ratio of the planetary gearset 40. The planet carrier assembly members 36 and 26 are rotated at a speed determined by the speed of the sun gear member 32, the speed of the ring gear member 34, and the ring gear/sun gear tooth ratio of the planetary gearset 30. The ring gear member 24 and therefore output shaft 19 are rotated at a speed determined by the speed of the sun gear member 22, the speed of the planet carrier assembly member 26, and the ring gear/sun gear tooth ratio of the planetary gearset 20. The numerical value of the third forward speed ratio is determined by the ring gear/sun gear tooth ratios of all three planetary gearsets 20, 30, and 40.

The fourth forward speed ratio is established with the engagement of the torque-transmitting mechanisms 50 and 52. During the fourth forward speed ratio, the planetary gearsets 20 and 30 are rotated in unison with the input shaft 17. Therefore, the ring gear member 24 and output shaft 19 are also rotated in unison with the input shaft 17. The numerical value of the fourth forward speed ratio is one.

The fifth forward speed ratio is established with the engagement of the torque-transmitting mechanisms 50 and 56. During the fifth forward speed ratio, the sun gear members 32 and 42 are rotated at a speed determined by the speed of the planet carrier assembly member 36, the speed of the ring gear member 34, and the ring gear/sun gear tooth ratio of the planetary gearset 30. The planet carrier assembly member 46, ring gear member 34, and sun gear member 22 are rotated at a speed determined by the speed of the sun gear member 42 and the ring gear/sun gear tooth ratio of the planetary gearset 40. The ring gear member 24 and therefore output shaft 19 are rotated at a speed determined by the speed of the planet carrier assembly member 26, the speed of the sun gear member 22, and the ring gear/sun gear tooth ratio of the planetary gearset 20. The numerical value of the fifth forward speed ratio is determined by the ring gear/sun gear tooth ratios of all three planetary gearsets 20, 30, and 40.

The sixth forward speed ratio is established with the engagement of the torque-transmitting mechanisms 50 and 54. During the sixth forward speed ratio, the planet carrier assembly member 46 and sun gear member 22 are rotated at a speed determined by the speed of the sun gear member 42 and the ring gear/sun gear tooth ratio of the planetary gearset 40. The ring gear member 24 and therefore output shaft 19 are rotated at a speed determined by the speed of the planet carrier assembly member 26, the speed of the sun gear member 22, and the ring gear/sun gear tooth ratio of the planetary gearset 20. The numerical value of the sixth forward speed ratio is determined by the ring gear/sun gear tooth ratios of the planetary gearsets 20 and 40.

The seventh forward speed ratio is established with the engagement of the torque-transmitting mechanisms 50 and 58. During the seventh forward speed ratio, the ring gear member 24 and therefore output shaft 19 are rotated at a speed determined by the speed of the planet carrier assembly member 26 and the ring gear/sun gear tooth ratio of the planetary gearset 20. The numerical value of the seventh forward speed ratio is determined by the ring gear/sun gear tooth ratio of the planetary gearset 20.

Figures 3, 4:
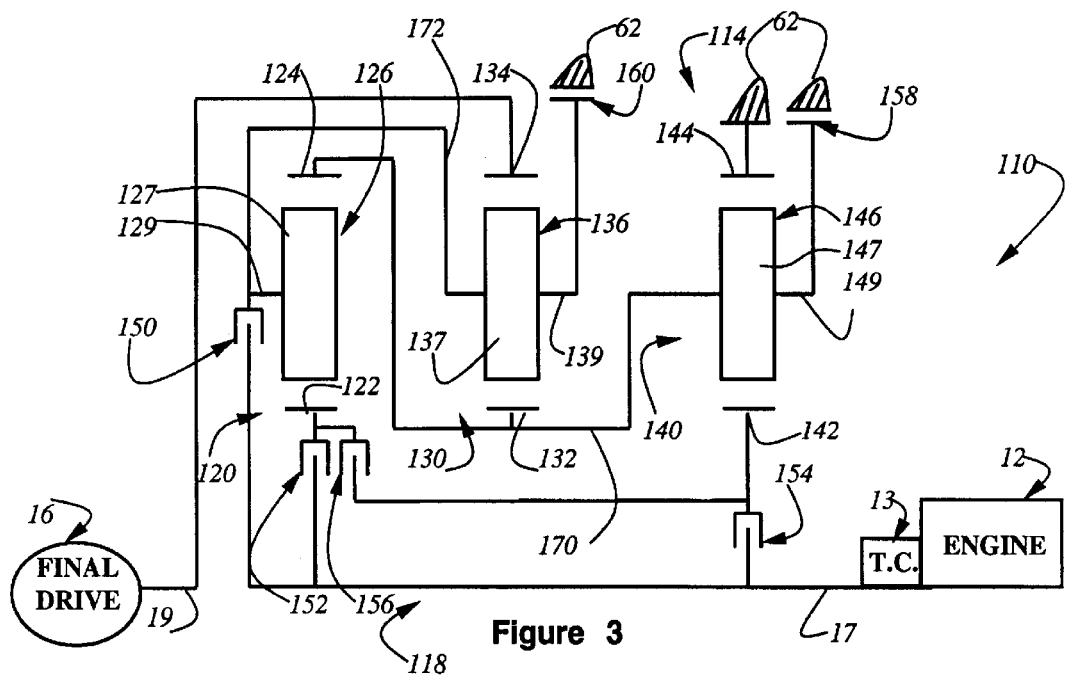
FIG. 3 is a schematic representation of a powertrain having a planetary transmission incorporating another embodiment of the present invention.
FIG. 4 is a truth table and chart providing information regarding the operating parameters of the power transmission shown in FIG. 3.

A powertrain 110 shown in FIG. 3 includes the engine 12, the starting device 13, a planetary transmission 114, and the final drive mechanism 16. The planetary transmission 114 includes the input shaft 17, a planetary gear arrangement 118, and the output shaft 19. The planetary gear arrangement 118 includes three planetary gearsets 120, 130, and 140, four rotating type torque-transmitting mechanisms 150, 152, 154, and 156, and two stationary type torque-transmitting mechanisms 158, and 160.

The planetary gearset 120 is a single pinion type planetary gearset having a sun gear member 122, a ring gear member 124, and a planet carrier assembly member 126. The planet carrier assembly member 126 includes a plurality of pinion gear members 127 rotatably mounted on a planet carrier member 129 and disposed in meshing relationship with the sun gear member 122 and the ring gear member 124.

The planetary gearset 130 is a single pinion type planetary gearset having a sun gear member 132, a ring gear member 134, and a planet carrier assembly member 136. The planet carrier assembly member 136 includes a plurality of pinion gear members 137 rotatably mounted on a planet carrier assembly member 139 and disposed in meshing relationship with the sun gear member 132 and the ring gear member 134.

The planetary gearset 140 is a single pinion type planetary gearset having a sun gear member 142, a ring gear member 144, and a planet carrier assembly member 146. The planet carrier assembly member 146 includes a plurality of pinion gear members 147 rotatably mounted on a planet carrier member 149 and disposed in meshing relationship with the sun gear member 142 and the ring gear member 144.

An interconnecting member 170 continuously interconnects the ring gear member 124, the sun gear member 132, and the planet carrier assembly member 146. An interconnecting member 172 continuously interconnects the planet carrier assembly members 126 and 136. The ring gear member 144 is continuously interconnected with the transmission housing 62. The ring gear member 134 is continuously interconnected with the transmission output shaft 19.

The input shaft 17 is selectively interconnectible with the interconnecting member 172 through the torque-transmitting mechanism 150, selectively interconnectible with the sun gear member 122 through the torque-transmitting mechanism 152, and selectively interconnectible with the sun gear member 142 through the torque-transmitting mechanism 154. The sun gear members 142 and 122 are selectively interconnectible through the torque-transmitting mechanism 156. The interconnecting member 172 is selectively connectible with the transmission housing 62 through the torque-transmitting mechanism 160. The interconnecting member 170 is selectively connectible with the transmission housing 62 through the torque-transmitting mechanism 158.

As seen in the truth table of FIG. 4, the torque-transmitting mechanisms are engaged in combinations of two to establish seven forward speed ratios and one reverse speed ratio between the input shaft 17 and the output shaft 19. The truth table also provides a numerical example for the speed ratios that can be obtained with the planetary transmission 114. These numerical values are established by the ring gear/sun gear tooth ratios of the planetary gearsets 120, 130, and 140, which are given as R1/S1, R2/S2, and R3/S3, respectively. Also provided in FIG. 4 is a chart giving the numerical value of the ratio steps between adjacent forward speed ratios as well as between the reverse and first forward speed ratio when the calculated speed ratio shown in the truth table are employed. The chart of FIG. 4 also provides a numerical value for the overall ratio spread of the forward speed ratios.

The reverse speed ratio is established with the engagement of the torque-transmitting mechanisms 154 and 160. During the reverse speed ratio, the sun gear member 142 is connected with the input shaft 17 and the planet carrier assembly members 126 and 136 are connected with the transmission housing 62. Also during the reverse speed ratio, the planet carrier assembly member 146 and sun gear member 132 are rotated at a speed determined by the speed of the sun gear member 142 and the ring gear/sun gear tooth ratio of the planetary gearset 140. The ring gear member 134 and therefore output shaft 19 are rotated at a speed determined by the speed of the sun gear member 132 and the ring gear/sun gear tooth ratio of the planetary gearset 130. The numerical value of the reverse speed ratio is determined by the ring gear/sun gear tooth ratios of the planetary gearsets 130 and 140.

The first forward speed ratio is established with the engagement of the torque-transmitting mechanisms 152 and 160. During the first forward speed ratio, the sun gear member 122 is connected with the input shaft 17 and the planet carrier assembly member 126 remains connected with the transmission housing 62. Also during the first forward speed ratio, the ring gear member 124 and sun gear member 132 are rotated at a speed determined by the speed of the sun gear member 122 and the ring gear/sun gear tooth ratio of the planetary gearset 120. The ring gear member 134 and therefore output shaft 19 are rotated at a speed determined by the speed of the sun gear member 132 and the ring gear/sun gear tooth ratio of the planetary gearset 130. The numerical value of the first forward speed ratio is determined by the ring gear/sun gear tooth ratios of the planetary gearsets 120 and 130.

The second forward speed ratio is established with the engagement of the torque-transmitting mechanisms 152 and 158. During the second forward speed ratio, the sun gear member 122 remains engaged with the input shaft 17 while the interconnecting member 170 is connected with the transmission housing 62. Also during the second forward speed ratio, the planet carrier assembly members 126 and 136 are rotated at a speed determined by the speed of the sun gear member 122 and the ring gear/sun gear tooth ratio of the planetary gearset 120. The ring gear member 134 and therefore output shaft 19 are rotated at a speed determined by the speed of the planet carrier assembly member 136 and the ring gear/sun gear tooth ratio of the planetary gearset 130. The numerical value of the second forward speed ratio is determined by the ring gear/sun gear tooth ratios of the planetary gearsets 120 and 130.

The third forward speed ratio is established with the engagement of the torque-transmitting mechanisms 152 and 156. During the third forward speed ratio, the sun gear members 122 and 142 are driven by the input shaft 17. Also during the third forward speed ratio, the planet carrier assembly member 146, sun gear member 132, and ring gear member 124 are rotated at a speed determined by the speed of the sun gear member 142 and the ring gear/sun gear tooth ratio of the planetary gearset 140. The planet carrier assembly members 126 and 136 are rotated at a speed determined by the speed of the sun gear member 122, the speed of the ring gear member 124, and the ring gear/sun gear tooth ratio of the planetary gearset 120. The ring gear member 134 and therefore output shaft 19 are rotated at a speed determined by the speed of the sun gear member 132, the speed of the planet carrier assembly member 136, and the ring gear/sun gear tooth ratio of the planetary gearset 130. The numerical value of the third forward speed ratio is determined by the ring gear/sun gear tooth ratios of all three planetary gearsets 120, 130, and 140.

The fourth forward speed ratio is established with the engagement of the torque-transmitting mechanisms 150 and 152. During the fourth forward speed ratio, the sun gear member 122 and the planet carrier assembly members 126 and 136 are rotated in unison with the input shaft 17. Also during the fourth forward speed ratio, the planetary gearsets 120 and 130 are rotated in unison with the input shaft 17. The numerical value of the fourth forward speed ratio is one.

The fifth forward speed ratio is established with the engagement of the torque-transmitting mechanisms 150 and 154. During the fifth forward speed ratio, the planet carrier assembly members 126 and 136 are rotated in unison with the input shaft 17, and the sun gear members 122 and 142 are interconnected. Also during the fifth forward speed ratio, the sun gear members 122 and 142 are rotated at a speed determined by the speed of the planet carrier assembly member 126, the speed of the ring gear member 124 and the ring gear/sun gear tooth ratio of the planetary gearset 120. The planet carrier assembly member 146, sun gear member 132, and ring gear member 124 are rotated at a speed determined by the speed of the sun gear member 142 and the ring gear/sun gear tooth ratio of the planetary gearset 140. The ring gear member 134 and therefore output shaft 19 are rotated at a speed determined by the speed of the planet carrier assembly member 136, the speed of the sun gear member 132, and the ring gear/sun gear tooth ratio of the planetary gearset 130. The numerical value of the fifth forward speed ratio is determined by the ring gear/sun gear tooth ratios of all three planetary gearsets 120, 130, and 140.

The sixth forward speed ratio is established with the engagement of the torque-transmitting mechanisms 150 and 154 which effectively connect the sun gear member 142 and the planet carrier assembly members 126 and 136 with the input shaft 17. During the sixth forward speed ratio, the planet carrier assembly member 146 and sun gear member 132 are rotated at a speed determined by the speed of the sun gear member 142 and the ring gear/sun gear tooth ratio of the planetary gearset 140. The ring gear member 134 and therefore output shaft 19 are rotated at a speed determined by the speed of the planet carrier assembly member 136, the speed of the sun gear member 132, and the ring gear/sun gear tooth ratio of the planetary gearset 130. The numerical value of the sixth forward speed ratio is determined by the ring gear/sun gear tooth ratios of the planetary gearsets 130 and 140.

The seventh forward speed ratio is established with the engagement of the torque-transmitting mechanisms 150 and 158. This combination of engagements connects the input shaft 17 with the planet carrier assembly member 136 and the sun gear member 132 with the transmission housing 62. During the seventh forward speed ratio, the ring gear member 134 is rotated at a speed determined by the speed of the planet carrier assembly member 136 and the ring gear/sun gear tooth ratio of the planetary gearset 130. The numerical value of the seventh forward speed ratio is determined by the ring gear/sun gear tooth ratio of the planetary gearset 130.

Figures 5, 6:
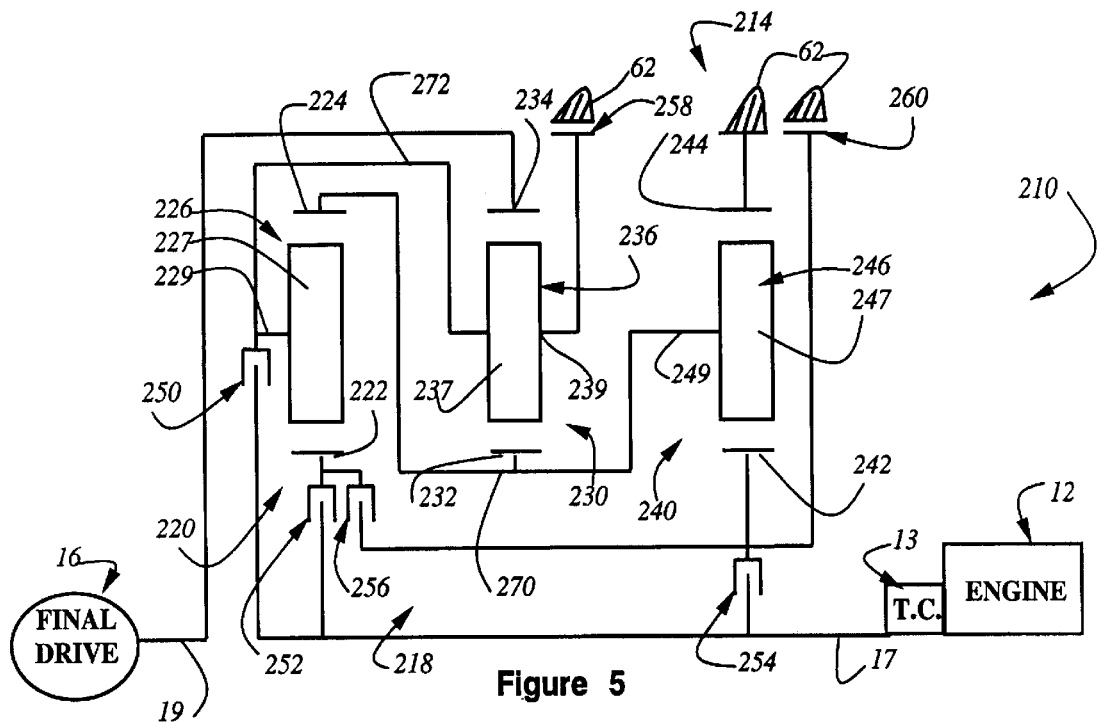
FIG. 5 is a schematic representation of a powertrain having a planetary transmission incorporating another embodiment of the present invention.
FIG. 6 is a truth table and chart providing information regarding the operating parameters of the power transmission shown in FIG. 5.

A powertrain 210 shown in FIG. 5 includes the engine 12, the starting device 13, a planetary transmission 214, and the final drive mechanism 16. The planetary transmission 214 includes the input shaft 17, a planetary gear arrangement 218, and the output shaft 19. The planetary gear arrangement 218 includes three planetary gearsets 220, 230, and 240, four rotating type torque-transmitting mechanisms 250, 252, 254, and 256, and two stationary type torque-transmitting mechanisms 258, and 260.

The planetary gearset 220 is a simple or single pinion type planetary gearset having a sun gear member 222, a ring gear member 224, and a planet carrier assembly member 226. The planet carrier assembly member 226 includes a plurality of pinion gear members 227 rotatably mounted on a planet carrier member 229 and disposed in meshing relationship with both the sun gear member 222 and the ring gear member 224.

The planetary gearset 230 is a simple or single pinion type planetary gearset having a sun gear member 232, a ring gear member 234, and a planet carrier assembly member 236. The planet carrier assembly member 236 includes a plurality of pinion gear members 237 rotatably mounted on a planet carrier assembly member 239 and disposed in meshing relationship with the sun gear member 232 and the ring gear member 234.

The planetary gearset 240 is a simple or single pinion type planetary gearset having a sun gear member 242, a ring gear member 244, and a planet carrier assembly member 246. The planet carrier assembly member 246 includes a plurality of pinion gear members 247 rotatably mounted on a planet carrier member 249 and disposed in meshing relationship with the sun gear member 242 and the ring gear member 244.

The ring gear member 224, the sun gear member 232, and the planet carrier assembly member 246 are continuously interconnected by an interconnecting member 270. The planet carrier assembly members 226 and 236 are continuously interconnected by an interconnecting member 272. The ring gear member 234 is continuously connected with the transmission output shaft 19. The ring gear member 244 is continuously connected with the transmission housing 62.

The input shaft 17 is selectively interconnectible with the interconnecting member 272 through the torque-transmitting mechanism 250, selectively interconnectible with the sun gear member 222 through the torque-transmitting mechanism 252, and selectively interconnectible with the sun gear member 242 through the torque-transmitting mechanism 254. The sun gear member 242 is selectively interconnectible with the sun gear member 222 through the torque-transmitting mechanism 256, and selectively interconnectible with the transmission housing 62 through the torque-transmitting mechanism 260. The interconnecting member 272 is selectively interconnectible with the transmission housing 62 through the torque-transmitting mechanism 258.

The truth table of FIG. 6 describes the combinations of engagements and sequence of engagement for the torque-transmitting mechanisms in order to establish seven forward speed ratios and one reverse speed ratio between the input shaft 17 and the output shaft 19. The truth table of FIG. 6 also provides a numerical example for the speed ratios that are available with the planetary gear arrangement 218 when the ring gear/sun gear tooth ratios of the planetary gearsets 220, 230, and 240 are as represented by R1/S1, R2/S2, and R3/S3, respectively. Also provided in FIG. 6 is a chart providing the numerical value of the ratio steps between adjacent forward speed ratios as well as between the reverse and first forward speed ratio when the numerical example of the given speed ratios is employed. The chart of FIG. 6 also provides a numerical value for the overall ratio spread of the forward speed ratios.

The reverse speed ratio is established with the engagement of the torque-transmitting mechanisms 254 and 258. During the reverse speed ratio, the planet carrier assembly member 246 and sun gear member 232 are rotated at a speed determined by the speed of the sun gear member 242 and the ring gear/sun gear tooth ratio of the planetary gearset 240. The ring gear member 234 and therefore output shaft 19 are rotated at a speed determined by the speed of the sun gear member 232 and the ring gear/sun gear tooth ratio of the planetary gearset 230. The numerical value of the reverse speed ratio is determined by the ring gear/sun gear tooth ratios of the planetary gearsets 230 and 240.

The first forward speed ratio is established with the engagement of the torque-transmitting mechanisms 252 and 258. During the first forward speed ratio, the ring gear member 224 and sun gear member 232 are rotated at a speed determined by the speed of the sun gear member 222 and the ring gear/sun gear tooth ratio of the planetary gearset 220. The ring gear member 234 and therefore output shaft 19 are rotated at a speed determined by the speed of the sun gear member 232 and the ring gear/sun gear tooth ratio of the planetary gearset 230. The numerical value of the first forward speed ratio is determined by the ring gear/sun gear tooth ratios of the planetary gearsets 220 and 230.

The second forward speed ratio is established with the engagement of the torque-transmitting mechanisms 252 and 260. During the second forward speed ratio, the planet carrier assembly members 226 and 236 are rotated at a speed determined by the speed of the sun gear member 222 and the ring gear/sun gear tooth ratio of the planetary gearset 220. The ring gear member 234 and therefore output shaft 19 are rotated at a speed determined by the speed of the ring gear member 232 and the ring gear/sun gear tooth ratio of the planetary gearset 230. The numerical value of the second forward speed ratio is determined by the ring gear/sun gear tooth ratios of the planetary gearsets 220 and 230.

The third forward speed ratio is established with the engagement of the torque-transmitting mechanisms 252 and 256. During the third forward speed ratio the planet carrier assembly member 246, sun gear member 232, and ring gear member 224 are rotated at a speed determined by the speed of the sun gear member 242 and the ring gear/sun gear tooth ratio of the planetary gearset 240. The planet carrier assembly members 226 and 236 are rotated at a speed determined by the speed of the sun gear member 222, the speed of the ring gear member 224, and the ring gear/sun gear tooth ratio of the planetary gearset 220. The ring gear member 234 and therefore output shaft 19 are rotated at a speed determined by the speed of the sun gear member 232, the speed of the planet carrier assembly member 236, and the ring gear/sun gear tooth ratio of the planetary gearset 230. The numerical value of the third forward speed ratio is determined by the ring gear/sun gear tooth ratios of all three planetary gearsets 220, 230, and 240.

The fourth forward speed ratio is established with the engagement of the torque-transmitting mechanisms 250 and 252. During the fourth forward speed ratio, the planetary gearsets 220 and 230 are rotated in unison with the input shaft 17 and therefore the ring gear member 234 and output shaft 19 also rotate in unison with the input shaft 17. The numerical value of the fourth forward speed ratio is one.

The fifth forward speed ratio is established with the engagement of the torque-transmitting mechanisms 252 and 256. During the fifth forward speed ratio, the sun gear members 222 and 242 are rotated at a speed determined by the speed of the of the planet carrier assembly member 226, the speed of the ring gear member 224, and the ring gear/sun gear tooth ratio of the planetary gearset 220. The planet carrier assembly member 246, sun gear member 232, and ring gear member 224 are rotated at a speed determined by the speed of the sun gear member 242 and the ring gear/sun gear tooth ratio of the planetary gearset 240. The ring gear member 234 and therefore output shaft 19 are rotated at a speed determined by the speed of the planet carrier assembly member 236, the speed of the sun gear member 232, and the ring gear/sun gear tooth ratio of the planetary gearset 230. The numerical value of the fifth forward speed ratio is determined by the ring gear/sun gear tooth ratios of all three planetary gearsets 220, 230, and 240.

The sixth forward speed ratio is established with the engagement of the torque-transmitting mechanisms 250 and 254. During the sixth forward speed ratio, the planet carrier assembly member 246 and sun gear member 232 are rotated at a speed determined by the speed of the sun gear member 242 and the ring gear/sun gear tooth ratio of the planetary gearset 240. The ring gear member 234 and therefore output shaft 19 are rotated at a speed determined by the speed of the planet carrier assembly member 236, the speed of the sun gear member 232, and the ring gear/sun gear tooth ratio of the planetary gearset 230. The numerical value of the sixth forward speed ratio is determined by the ring gear/sun gear tooth ratios of the planetary gearsets 230 and 240.

The seventh forward speed ratio is established with the engagement of the torque-transmitting mechanisms 250 and 260. During the seventh forward speed ratio, the ring gear member 234 and therefore output shaft 19 are rotated at a speed determined by the speed of the planet carrier assembly member 236 and the ring gear/sun gear tooth ratio of the planetary gearset 230. The numerical value of the seventh forward speed ratio is determined by the ring gear/sun gear tooth ratio of the planetary gearset 230.

Figures 7, 8:
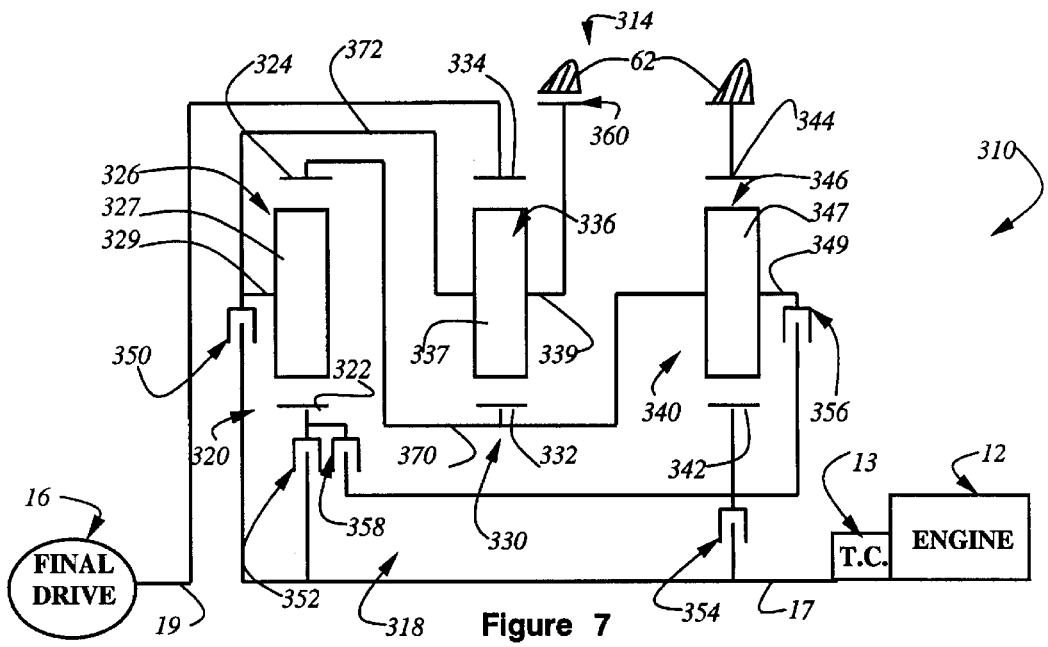
FIG. 7 is a schematic representation of a powertrain having a planetary transmission incorporating another embodiment of the present invention.
FIG. 8 is a truth table and chart providing information regarding the operating parameters of the power transmission shown in FIG. 7.

A powertrain 310 shown in FIG. 7 includes the engine 12, the starting device 13, a planetary transmission 314, and the final drive mechanism 16. The planetary transmission 314 includes the input shaft 17, a planetary gear arrangement 318, and the output shaft 19. The planetary gear arrangement 318 includes three planetary gearsets 320, 330, and 340, five rotating type torque-transmitting mechanisms 350, 352, 354, 356 and 258, and one stationary type torque-transmitting mechanism 360.

The planetary gearset 320 is a simple type planetary gearset having a sun gear member 322, a ring gear member 324, and a planet carrier assembly member 326. The planet carrier assembly member 326 includes a plurality of pinion gear members 327 rotatably mounted on a planet carrier member 329 and disposed in meshing relationship with both the sun gear member 322 and the ring gear member 324.

The planetary gearset 330 is a simple type planetary gearset having a sun gear member 332, a ring gear member 334, and a planet carrier assembly member 336. The planet carrier assembly member 336 includes a plurality of pinion gear members 337 rotatably mounted on a planet carrier assembly member 339 and disposed in meshing relationship with the sun gear member 332 and the ring gear member 334.

The planetary gearset 340 is a simple type planetary gearset having a sun gear member 342, a ring gear member 344, and a planet carrier assembly member 346. The planet carrier assembly member 346 includes a plurality of pinion gear members 347 rotatably mounted on a planet carrier member 349 and disposed in meshing relationship with the sun gear member 342 and the ring gear member 344.

The ring gear member 324, the sun gear member 332, and the planet carrier assembly member 346 are continuously interconnected by an interconnecting member 370. The planet carrier assembly members 326 and 336 are continuously interconnected by an interconnecting member 372. The ring gear member 334 is continuously connected with the transmission output shaft 19. The ring gear member 344 is continuously connected with the transmission housing 62.

The input shaft 17 is selectively interconnectible with the interconnecting member 372 through the torque-transmitting mechanism 350, selectively interconnectible with the sun gear member 322 through the torque-transmitting mechanism 352, and selectively connectible with the sun gear member 342 through the torque-transmitting mechanism 354. The sun gear member 342 is selectively interconnectible with the interconnecting member 370 through the torque-transmitting mechanism 356, and selectively interconnectible with the sun gear member 322 through the torque-transmitting mechanism 358. The interconnecting member 272 is selectively interconnectible with the transmission housing 62 through the torque-transmitting mechanism 360.

The truth table of FIG. 8 describes the engagement combinations and sequence for the torque-transmitting mechanisms in order to establish seven forward speed ratios and one reverse speed ratio between the input shaft 17 and the output shaft 19. Also given in the truth table of FIG. 8 is a numerical example of the speed ratios that are available with the planetary gear arrangement 318 when the ring gear/sun gear tooth ratios of the planetary gearsets 320, 330, and 340 are as represented in FIG. 8 as R1/S1, R2/S2, and R3/S3, respectively. Also provided in FIG. 8 is a chart describing the numerical values of the ratio steps between adjacent forward speed ratios as well as between the reverse and first forward speed ratio. Further information given in the chart of FIG. 8 is the numerical value for the overall ratio spread of the forward speed ratios.

The reverse speed ratio is established with the engagement of the torque-transmitting mechanisms 354 and 360. During the reverse speed ratio, the planet carrier assembly member 346 and sun gear member 332 are rotated at a speed determined by the speed of the sun gear member 342 and the ring gear/sun gear tooth ratio of the planetary gearset 340. The ring gear member 334 and therefore output shaft 19 are rotated at a speed determined by the speed of the sun gear member 332 and the ring gear/sun gear tooth ratio of the planetary gearset 330. The numerical value of the reverse speed ratio is determined by the ring gear/sun gear tooth ratios of the planetary gearsets 330 and 340.

The first forward speed ratio is established with the engagement of the torque-transmitting mechanisms 352 and 360. During the first forward speed ratio, the ring gear member 324 and sun gear member 332 are rotated at a speed determined by the speed of the sun gear member 322 and the ring gear/sun gear tooth ratio of the planetary gearset 320. The ring gear member 334 and therefore output shaft 19 are rotated at a speed determined by the speed of the sun gear member 332 and the ring gear/sun gear tooth ratio of the planetary gearset 330. The numerical value of the first forward speed ratio is determined by the ring gear/sun gear tooth ratios of the planetary gearsets 320 and 330.

The second forward speed ratio is established with the engagement of the torque-transmitting mechanisms 352 and 356. During the second forward speed ratio, the planet carrier assembly members 326 and 336 are rotated at a speed determined by the speed of the sun gear member 322 and the ring gear/sun gear tooth ratio of the planetary gearset 320. The speed of the ring gear member 334 and therefore output shaft 19 are determined by the speed of the planet carrier assembly member 336 and the ring gear/sun gear tooth ratio of the planetary gearset 330. The numerical value of the second forward speed ratio is determined by the ring gear/sun gear tooth ratios of the planetary gearsets 320 and 330.

The third forward speed ratio is established with the engagement of the torque-transmitting mechanisms 352 and 358. During the third forward speed ratio, the planet carrier assembly member 346, sun gear member 332, and ring gear member 324 are rotated at a speed determined by the speed of the sun gear member 342 and the ring gear/sun gear tooth ratio of the planetary gearset 340. The planet carrier assembly members 326 and 336 are rotated at a speed determined by the speed of the sun gear member 332, the speed of the ring gear member 324, and the ring gear/sun gear tooth ratio of the planetary gearset 320. The ring gear member 334 and therefore output shaft 19 are rotated at a speed determined by the speed of the sun gear member 332, the speed of the planet carrier assembly member 336, and the ring gear/sun gear tooth ratio of the planetary gearset 330. The numerical value of the third forward speed ratio is determined by the ring gear/sun gear tooth ratios of all three planetary gearsets 320, 330, and 340.

The fourth forward speed ratio is established with the engagement of the torque-transmitting mechanisms 350 and 352. During the fourth forward speed ratio, the input shaft 17 and the output shaft 19, as well as the planetary gearsets 320 and 330, rotate in unison. The numerical value of the fourth forward speed ratio is one.

The fifth forward speed ratio is established with the engagement of the torque-transmitting mechanisms 350 and 358. During the fifth forward speed ratio, the sun gear member 322 and sun gear member 342 are rotated at a speed determined by the speed of the planet carrier assembly member 326, the speed of the ring gear member 324, and the ring gear/sun gear tooth ratio of the planetary gearset 320. The planet carrier assembly member 346, sun gear member 332, and ring gear member 324 are rotated at a speed determined by the speed of the sun gear member 342 and the ring gear/sun gear tooth ratio of the planetary gearset 340. The ring gear member 334 and therefore output shaft 19 are rotated at a speed determined by the speed of the planet carrier assembly member 336, the speed of the sun gear member 332, and the ring gear/sun gear tooth ratio of the planetary gearset 330. The numerical value of the fifth forward speed ratio is determined by the ring gear/sun gear tooth ratios of all three planetary gearsets 320, 330, and 340.

The sixth forward speed ratio is established with the engagement of the torque-transmitting mechanisms 350 and 354. During the sixth forward speed ratio, the planet carrier assembly member 346 and sun gear member 332 are rotated at a speed determined by the speed of the sun gear member 342 and the ring gear/sun gear tooth ratio of the planetary gearset 340. The ring gear member 334 and therefore output shaft 19 are rotated at a speed determined by the speed of the planet carrier assembly member 336, the speed of the sun gear member 332, and the ring gear/sun gear tooth ratio of the planetary gearset 330. The numerical value of the sixth forward speed ratio is determined by the ring gear/sun gear tooth ratios of the planetary gearsets 330 and 340.

The seventh forward speed ratio is established with the engagement of the torque-transmitting mechanisms 350 and 356. During the seventh forward speed ratio, the ring gear member 334 and therefore output shaft 19 are rotated at a speed determined by the speed of the planet carrier assembly member 336 and the ring gear/sun gear tooth ratio of the planetary gearset 330. The numerical value of the seventh forward speed ratio is determined by the ring gear/sun gear tooth ratio of the planetary gearset 330.

Figures 9, 10:
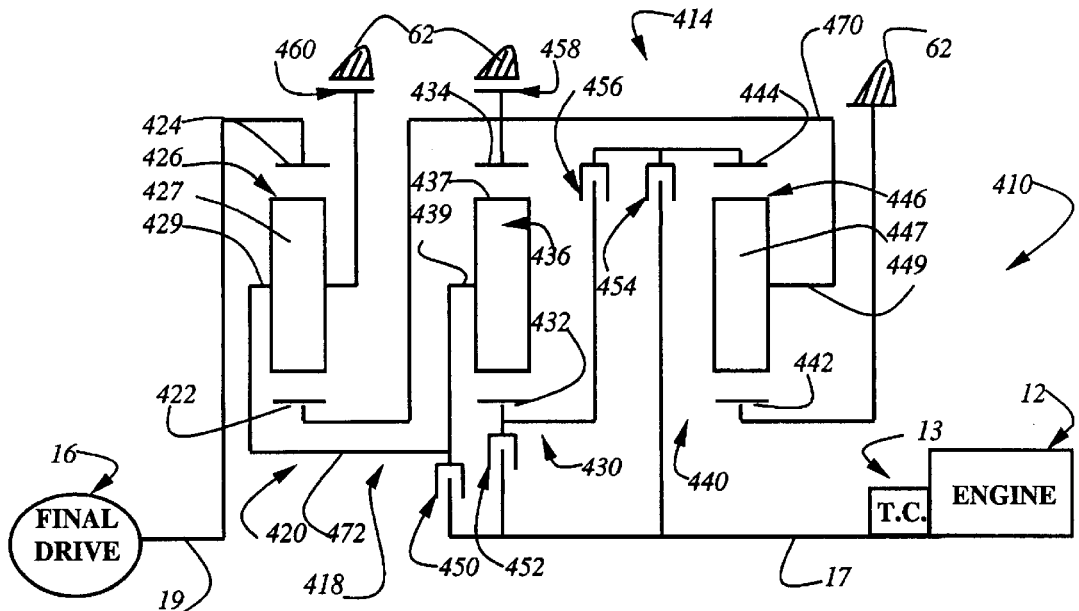
FIG. 9 is a schematic representation of a powertrain having a planetary transmission incorporating another embodiment of the present invention.
FIG. 10 is a truth table and chart providing information regarding the operating parameters of the power transmission shown in FIG. 9.

A powertrain 410 shown in FIG. 9 includes the engine 12, the starting device 13, a planetary transmission 414, and the final drive mechanism 16. The planetary transmission 414 includes the input shaft 17, a planetary gear arrangement 418, and the output shaft 19. The planetary gear arrangement 418 includes three planetary gearsets 420, 430, and 440, four rotating type torque-transmitting mechanisms 450, 452, 454, and 456, and two stationary type torque-transmitting mechanisms 458 and 460.

The planetary gearset 420 is a simple type planetary gearset having a sun gear member 422, a ring gear member 424, and a planet carrier assembly member 426. The planet carrier assembly member 426 includes a plurality of pinion gear members 427 rotatably mounted on a planet carrier member 429 and disposed in meshing relationship with both the sun gear member 422 and the ring gear member 424.

The planetary gearset 430 is a simple type planetary gearset having a sun gear member 432, a ring gear member 434, and a planet carrier assembly member 436. The planet carrier assembly member 436 includes a plurality of pinion gear members 437 rotatably mounted on a planet carrier assembly member 439 and disposed in meshing relationship with the sun gear member 432 and the ring gear member 434.

The planetary gearset 440 is a simple type planetary gearset having a sun gear member 442, a ring gear member 444, and a planet carrier assembly member 446. The planet carrier assembly member 446 includes a plurality of pinion gear members 447 rotatably mounted on a planet carrier member 449 and disposed in meshing relationship with the sun gear member 442 and the ring gear member 444.

An interconnecting member 470 continuously interconnects the sun gear member 422, the ring gear member 434, and the planet carrier assembly member 446. An interconnecting member 472 continuously interconnects the planet carrier assembly member 426 and the planet carrier assembly member 436. The sun gear member 442 is continuously interconnected with the transmission housing 62. The output shaft 19 is continuously interconnected with the ring gear member 424.

The input shaft 17 is selectively interconnectible with the interconnecting member 472 through the torque-transmitting mechanism 450, selectively interconnectible with the sun gear member 432 through the torque-transmitting mechanism 452, and selectively interconnectible with the ring gear member 444 through the torque-transmitting mechanism 454. The ring gear member 444 and the sun gear member 432 are selectively interconnectible through the torque-transmitting mechanism 456. The interconnecting member 470 is selectively interconnectible with the transmission housing 62 through the torque-transmitting mechanism 458. The interconnecting member 472 is selectively interconnectible with the transmission housing 62 through the torque-transmitting mechanism 460.

The truth table of FIG. 10 describes the engagement combinations and sequence for the torque-transmitting mechanisms in order to establish seven forward speed ratios and one reverse speed ratio between the input shaft 17 and the output shaft 19. The truth table also provides a numerical example of the speed ratios that are available with the planetary gear arrangement 418 when the ring gear/sun gear tooth ratios of the planetary gearsets 420, 430, and 440 are as given in FIG. 10 as R1/S1, R2/S2, and R3/S3, respectively. Also given in FIG. 10 is a chart showing the numerical value for the ratio steps between adjacent forward speed ratios as well as between the reverse and first forward speed ratio when the sample numerical values shown in the truth table are employed. Further information given in the chart of FIG. 10 is the overall ratio spread for the forward speed ratios.

The reverse speed ratio is established with the engagement of the torque-transmitting mechanisms 454 and 460. During the reverse speed ratio, the planet carrier assembly member 446 and sun gear member 422 are rotated at a speed determined by the speed of the ring gear member 444 and the ring gear/sun gear tooth ratio of the planetary gearset 440. The ring gear member 424 and therefore output shaft 19 are rotated at a speed determined by the speed of the sun gear member 422 and the ring gear/sun gear tooth ratio of the planetary gearset 420. The numerical value of the reverse speed ratio is determined by the ring gear/sun gear tooth ratios of the planetary gearsets 420 and 440.

The first forward speed ratio is established with the engagement of the torque-transmitting mechanisms 452 and 460. During the first forward speed ratio, the ring gear member 434 and sun gear member 422 are rotated at a speed determined by the speed of the sun gear member 432 and the ring gear/sun gear tooth ratio of the planetary gearset 430. The ring gear member 424 and therefore output shaft 19 are rotated at a speed determined by the speed of the sun gear member 422 and the ring gear/sun gear tooth ratio of the planetary gearset 420. The numerical value of the first forward speed ratio is determined by the ring gear/sun gear tooth ratios of the planetary gearsets 420 and 430.

The second forward speed ratio is established with the engagement of the torque-transmitting mechanisms 452 and 458. During the second forward speed ratio, the planet carrier assembly members 436 and 446 are rotated at a speed determined by the speed of the sun gear member 432 and the ring gear/sun gear tooth ratio of the planetary gearset 430. The ring gear member 424 and therefore output shaft 19 are rotated at a speed determined by the speed of the planet carrier assembly member 426 and the ring gear/sun gear tooth ratio of the planetary gearset 420. The numerical value of the second forward speed ratio is determined by the ring gear/sun gear tooth ratios of the planetary gearsets 420 and 430.

The third forward speed ratio is established with the engagement of the torque-transmitting mechanisms 452 and 456. During the third forward speed ratio, the planet carrier assembly member 446, ring gear member 434, and sun gear member 422 are rotated at a speed determined by the speed of the ring gear member 444 and the ring gear/sun gear tooth ratio of the planetary gearset 440. The planet carrier assembly members 436 and 426 are rotated at a speed determined by the speed of the sun gear member 432, the speed of the ring gear member 434, and the ring gear/sun gear tooth ratio of the planetary gearset 430. The speed of the ring gear member 424 and therefore output shaft 19 are rotated at a speed determined by the speed of the sun gear member 422, the speed of the planet carrier assembly member 426, and the ring gear/sun gear tooth ratio of the planetary gearset 420. The numerical value of the third forward speed ratio is determined by the ring gear/sun gear tooth ratios of all three planetary gearsets 420, 430, and 440.

The fourth forward speed ratio is established with the engagement of the torque-transmitting mechanisms 450 and 452. During the fourth forward speed ratio, the planetary gearsets 420 and 430, as well as the output shaft 19, are rotated in unison with the input shaft 17. The numerical value of the fourth forward speed ratio is one.

The fifth forward speed ratio is established with the engagement of the torque-transmitting mechanisms 450 and 456. During the fifth forward speed ratio, the sun gear member 432 and ring gear member 444 are rotated at a speed determined by the speed of the planet carrier assembly member 436, the speed of the ring gear member 434, and the ring gear/sun gear tooth ratio of the planetary gearset 430. The planet carrier assembly member 446, ring gear member 434, and sun gear member 422 are rotated at a speed determined by the speed of the ring gear member 444 and the ring gear/sun gear tooth ratio of the planetary gearset 440. The ring gear member 424 and therefore output shaft 19 are rotated at a speed determined by the speed of the planet carrier assembly member 426, the speed of the sun gear member 422, and the ring gear/sun gear tooth ratio of the planetary gearset 420. The numerical value of the fifth forward speed ratio is determined by the ring gear/sun gear tooth ratios of all three planetary gearsets 420, 430, and 440.

The sixth forward speed ratio is established with the engagement of the torque-transmitting mechanisms 450 and 454. During the sixth forward speed ratio, the planet carrier assembly member 446 and sun gear member 422 are rotated at a speed determined by the speed of the ring gear member 444 and the ring gear/sun gear tooth ratio of the planetary gearset 440. The ring gear member 424 and therefore output shaft 19 are rotated at a speed determined by the speed of the planet carrier assembly member 426, the speed of the sun gear member 422, and the ring gear/sun gear tooth ratio of the planetary gearset 420. The numerical value of the sixth forward speed ratio is determined by the ring gear/sun gear tooth ratios of the planetary gearsets 420 and 440.

The seventh forward speed ratio is established with the engagement of the torque-transmitting mechanisms 450 and 458. During the seventh forward speed ratio, the ring gear member 424 and therefore output shaft 19 are rotated at a speed determined by the speed of the planet carrier assembly member 426 and the ring gear/sun gear tooth ratio of the planetary gearset 420. The numerical value of the seventh forward speed ratio is determined by the ring gear/sun gear tooth ratio of the planetary gearset 420.

Figures 11, 12:
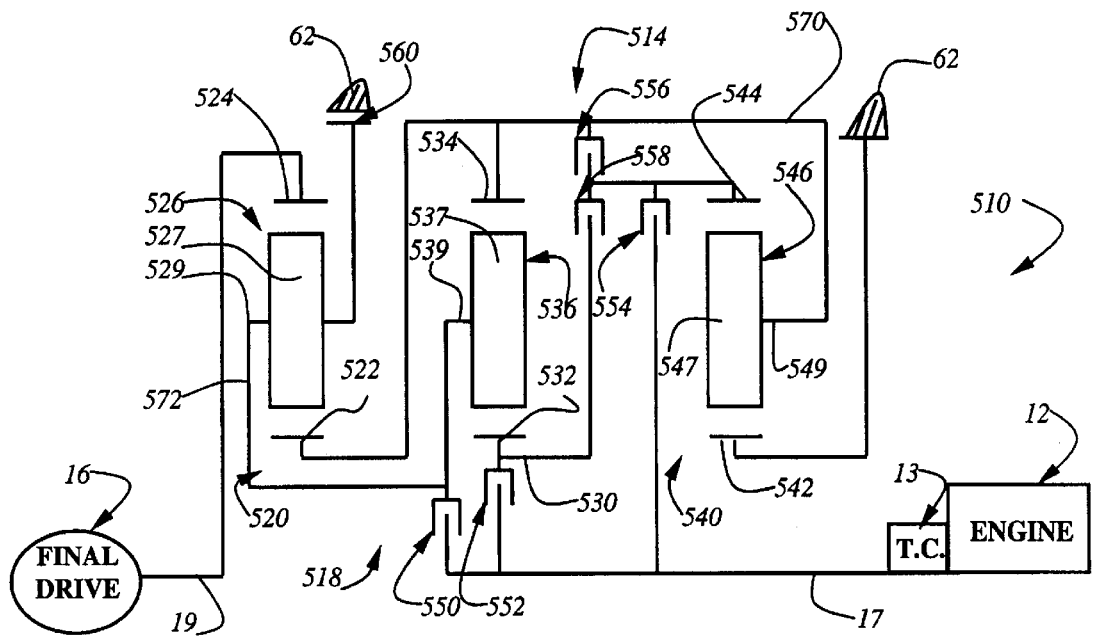
FIG. 11 is a schematic representation of a powertrain having a planetary transmission incorporating another embodiment of the present invention.
FIG. 12 is a truth table and chart providing information regarding the operating parameters of the power transmission shown in FIG. 11.

A powertrain 510 shown in FIG. 11 includes the engine 12, the starting device 13, a planetary transmission 514, and the final drive mechanism 16. The planetary transmission 514 includes the input shaft 17, a planetary gear arrangement 518, and the output shaft 19. The planetary gear arrangement 518 includes three simple planetary gearsets 520, 530, and 540, five rotating type torque-transmitting mechanisms 550, 552, 554, 556 and 558, and one stationary type torque-transmitting mechanism 560.

The simple planetary gearset 520 includes a sun gear member 522, a ring gear member 524, and a planet carrier assembly member 526. The planet carrier assembly member 526 includes a plurality of pinion gear members 527 rotatably mounted on a planet carrier member 529 and disposed in meshing relationship with both the sun gear member 522 and the ring gear member 524.

The simple planetary gearset 530 includes a sun gear member 532, a ring gear member 534, and a planet carrier assembly member 536. The planet carrier assembly member 536 includes a plurality of pinion gear members 537 rotatably mounted on a planet carrier assembly member 539 and disposed in meshing relationship with the sun gear member 532 and the ring gear member 534.

The simple planetary gearset 540 includes a sun gear member 542, a ring gear member 544, and a planet carrier assembly member 546. The planet carrier assembly member 546 includes a plurality of pinion gear members 547 rotatably mounted on a planet carrier member 549 and disposed in meshing relationship with the sun gear member 542 and the ring gear member 544.

The sun gear member 522, ring gear member 534, and planet carrier assembly member 546 are continuously interconnected by an interconnecting member 570. The planet carrier assembly member 526 and planet carrier assembly member 536 are continuously interconnected by an interconnecting member 572. The sun gear member 542 is continuously connected with the transmission housing 62. The ring gear member 524 is continuously connected with the output shaft 19.

The input shaft 17 is selectively interconnectible with the interconnecting member 572 through the torque-transmitting mechanism 550, selectively interconnectible with the sun gear member 532 through the torque-transmitting mechanism 552, and selectively connectible with the ring gear member 544 through the torque-transmitting mechanism 554. The ring gear member 544 and the interconnecting member 570 are selectively interconnectible through the torque-transmitting mechanism 556. The ring gear member 544 and the sun gear member 532 are selectively interconnectible through the torque-transmitting mechanism 558. The interconnecting member 572 is selectively interconnectible with the transmission housing 62 through the torque-transmitting mechanism 560.

The torque-transmitting mechanisms are engaged in combinations of two, as seen in the truth table of FIG. 12. The truth table also shows the sequence of engagements to establish seven forward speed ratios and one reverse speed ratio within the planetary transmission 514. The truth table provides further information such as an example of the numerical values for the seven forward speed ratios and the reverse speed ratio. These numerical values are determined by the ring gear/sun gear tooth ratios of the planetary gearsets 520, 530, and 540, which are given as R1/S1, R2/S2, and R3/S3, respectively, in FIG. 12. Also given in FIG. 12 is a chart, which describes the values for the ratio steps between adjacent forward speed ratios as well as between the reverse and first forward speed ratio. This chart also gives the numerical value for the overall ratio spread of the forward speed ratios.

The reverse speed ratio is established with the engagement of the torque-transmitting mechanisms 554 and 560. During the reverse speed ratio, the planet carrier assembly member 546 and sun gear member 522 are rotated at a speed determined by the speed of the ring gear member 544 and the ring gear/sun gear tooth ratio of the planetary gearset 540. The ring gear member 524 and therefore output shaft 19 are rotated at a speed determined by the speed of the sun gear member 522 and the ring gear/sun gear tooth ratio of the planetary gearset 520. The numerical value of the reverse speed ratio is determined by the ring gear/sun gear tooth ratios of the planetary gearsets 540 and 520.

The first forward speed ratio is established with the engagement of the torque-transmitting mechanisms 552 and 560. During the first forward speed ratio, the ring gear member 534 and sun gear member 522 are rotated at a speed determined by the speed of the sun gear member 532 and the ring gear/sun gear tooth ratio of the planetary gearset 530. The ring gear member 524 and therefore output shaft 19 are rotated at a speed determined by the speed of the sun gear member 522 and the ring gear/sun gear tooth ratio of the planetary gearset 520. The numerical value of the first forward speed ratio is determined by the ring gear/sun gear tooth ratios of the planetary gearsets 530 and 520.

The second forward speed ratio is established with the engagement of the torque-transmitting mechanisms 552 and 556. During the second forward speed ratio, the planet carrier assembly members 536 and 526 are rotated at a speed determined by the speed of the sun gear member 532 and the ring gear/sun gear tooth ratio of the planetary gearset 530. The ring gear member 524 and therefore output shaft 19 are rotated at a speed determined by the speed of the planet carrier assembly member 526 and the ring gear/sun gear tooth ratio of the planetary gearset 520. The numerical value of the second forward speed ratio is determined by the ring gear/sun gear tooth ratios of the planetary gearsets 530 and 520.

The third forward speed ratio is established with the engagement of the torque-transmitting mechanisms 552 and 558. During the third forward speed ratio, the planet carrier assembly member 546, ring gear member 534, and sun gear member 522 are rotated at a speed determined by the speed of the ring gear member 544 and the ring gear/sun gear tooth ratio of the planetary gearset 540. The planet carrier assembly members 536 and 526 are rotated at a speed determined by the speed of the sun gear member 532, the speed of the ring gear member 534, and the ring gear/sun gear tooth ratio of the planetary gearset 530. The ring gear member 524 and therefore output shaft 19 are rotated at a speed determined by the speed of the planet carrier assembly member 526, the speed of the sun gear member 522, and the ring gear/sun gear tooth ratio of the planetary gearset 520. The numerical value of the third forward speed ratio is determined by the ring gear/sun gear tooth ratios of all three planetary gearsets 520, 530, and 540.

The fourth forward speed ratio is established with the engagement of the torque-transmitting mechanisms 550 and 552. During the fourth forward speed ratio, the input shaft 17, planetary gearsets 520 and 530, and the output shaft 19 are all rotated in unison. The numerical value of the fourth forward speed ratio is therefore one.

The fifth forward speed ratio is established with the engagement of the torque-transmitting mechanisms 550 and 558. During the fifth forward speed ratio, the sun gear member 532 and ring gear member 544 are rotated at a speed determined by the speed of the planet carrier assembly member 536, the speed of the ring gear member 534, and the ring gear/sun gear tooth ratio of the planetary gearset 530. The planet carrier assembly member 546, ring gear member 534, and sun gear member 522 are rotated at a speed determined by the speed of the ring gear member 544 and the ring gear/sun gear tooth ratio of the planetary gearset 540. The ring gear member 524 and therefore output shaft 19 are rotated at a speed determined by the speed of the planet carrier assembly member 526, the speed of the sun gear member 522, and the ring gear/sun gear tooth ratio of the planetary gearset 520. The numerical value of the fifth forward speed ratio is determined by the ring gear/sun gear tooth ratios of all three planetary gearsets 520, 530, and 540.

The sixth forward speed ratio is established with the engagement of the torque-transmitting mechanisms 550 and 554. During the sixth forward speed ratio, the planet carrier assembly member 546 and sun gear member 522 are rotated at a speed determined by the speed of the ring gear member 544 and the ring gear/sun gear tooth ratio of the planetary gearset 540. The ring gear member 524 and therefore output shaft 19 are rotated at a speed determined by the speed of the planet carrier assembly member 526, the speed of the sun gear member 522, and the ring gear/sun gear tooth ratio of the planetary gearset 520. The numerical value of the sixth forward speed ratio is determined by the ring gear/sun gear tooth ratios of the planetary gearsets 540 and 520.

The seventh forward speed ratio is established with the engagement of the torque-transmitting mechanisms 550 and 556. During the seventh forward speed ratio, the ring gear member 524 and therefore output shaft 19 are rotated at a speed determined by the speed of the planet carrier assembly member 526 and the ring gear/sun gear tooth ratio of the planetary gearset 520. The numerical value of the seventh forward speed ratio is determined by the ring gear/sun gear tooth ratio of the planetary gearset 520.

Figures 13, 14:
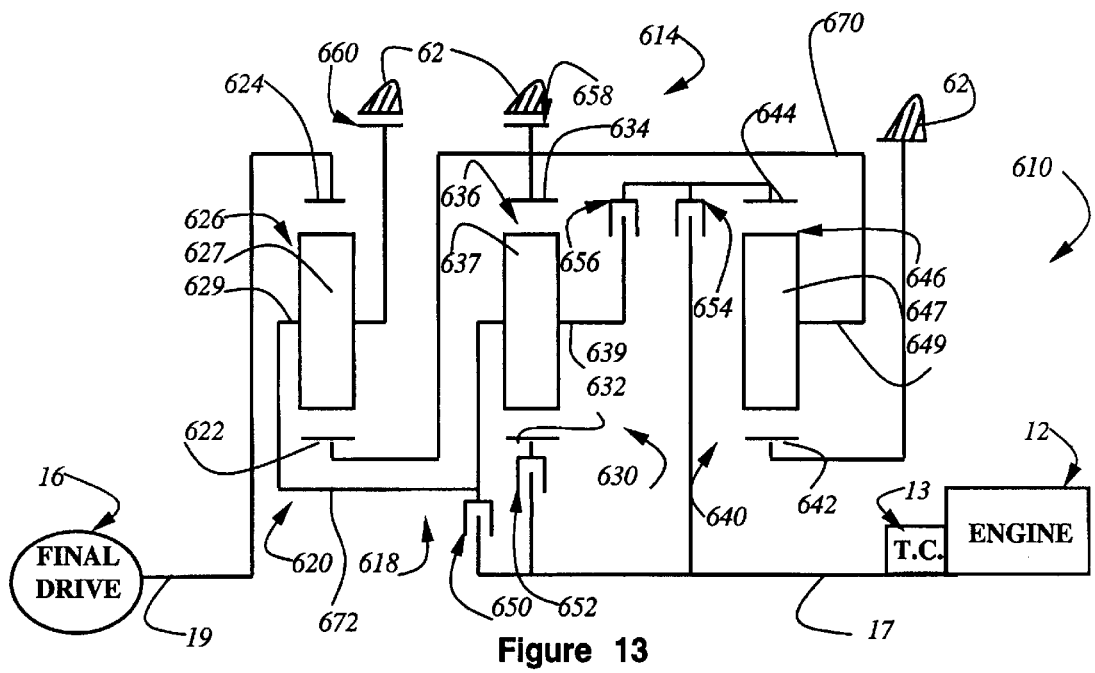
FIG. 13 is a schematic representation of a powertrain having a planetary transmission incorporating another embodiment of the present invention.
FIG. 14 is a truth table and chart providing information regarding the operating parameters of the power transmission shown in FIG. 13.

A powertrain 610 shown in FIG. 13 includes the engine 12, the starting device 13, a planetary transmission 614, and the final drive mechanism 16. The planetary transmission 614 includes the input shaft 17, a planetary gear arrangement 618, and the output shaft 19. The planetary gear arrangement 618 includes three simple planetary gearsets 620, 630, and 640, four rotating type torque-transmitting mechanisms 650, 652, 654, and 656, and two stationary type torque-transmitting mechanisms 658 and 660.

The simple planetary gearset 620 includes a sun gear member 622, a ring gear member 624, and a planet carrier assembly member 626. The planet carrier assembly member 626 includes a plurality of pinion gear members 627 rotatably mounted on a planet carrier member 629 and disposed in meshing relationship with both the sun gear member 622 and the ring gear member 624.

The simple planetary gearset 630 includes a sun gear member 632, a ring gear member 634, and a planet carrier assembly member 636. The planet carrier assembly member 636 includes a plurality of pinion gear members 637 rotatably mounted on a planet carrier assembly member 639 and disposed in meshing relationship with the sun gear member 632 and the ring gear member 634.

The simple planetary gearset 640 includes a sun gear member 642, a ring gear member 644, and a planet carrier assembly member 646. The planet carrier assembly member 646 includes a plurality of pinion gear members 647 rotatably mounted on a planet carrier member 649 and disposed in meshing relationship with the sun gear member 642 and the ring gear member 644.

The sun gear member 622, ring gear member 634, and planet carrier assembly member 646 are continuously interconnected by an interconnecting member 670. The planet carrier assembly member 626 and planet carrier assembly member 636 are continuously interconnected by an interconnecting member 672. The sun gear member 642 is continuously connected with the transmission housing 62. The output shaft 19 is continuously interconnected with the ring gear member 624.

The input shaft 17 is selectively interconnectible with the interconnecting member 672 through the torque-transmitting mechanism 650, selectively interconnectible with the sun gear member 632 through the torque-transmitting mechanism 652, and selectively interconnectible with the ring gear member 644 through the torque-transmitting mechanism 654. The interconnecting member 672 is selectively interconnectible with the ring gear member 644 through the torque-transmitting mechanism 656 and selectively interconnectible with the transmission housing 62 through the torque-transmitting mechanism 660. The interconnecting member 670 is selectively interconnectible with the transmission housing 62 through the torque-transmitting mechanism 658.

The torque-transmitting mechanisms are selectively engaged in combinations of two, as shown in the truth table of FIG. 14. The truth table of FIG. 14 also indicates the sequence of engagement for the combinations in order to provide seven forward speed ratios and one reverse speed ratio between the input shaft 17 and the output shaft 19. Also provided in the truth table is a numerical example of the speed ratios that are available with the planetary transmission 614 when the ring gear/sun gear tooth ratio of the planetary gearsets 620, 630, and 640 are selected as given by R1/S1, R2/S2, and R3/S3, respectively. A chart in FIG. 14 provides numerical values for the ratio steps between adjacent forward speed ratios as well as the overall ratio spread of the forward speed ratios. The reverse to first ratio step is also given.

The reverse speed ratio is established with the engagement of the torque-transmitting mechanisms 654 and 660. During the reverse speed ratio, the planet carrier assembly member 646 and sun gear member 622 are rotated at a speed determined by the speed of the ring gear member 644 and the ring gear/sun gear tooth ratio of the planetary gearset 640. The ring gear member 624 and therefore output shaft 19 are rotated at a speed determined by the speed of the sun gear member 622 and the ring gear/sun gear tooth ratio of the planetary gearset 620. The numerical value of the reverse speed ratio is determined by the ring gear/sun gear tooth ratios of the planetary gearsets 620 and 640.

The first forward speed ratio is established with the engagement of the torque-transmitting mechanisms 652 and 660. During the first forward speed ratio, the ring gear member 634 and sun gear member 622 are rotated at a speed determined by the speed of the sun gear member 632 and the ring gear/sun gear tooth ratio of the planetary gearset 630. The ring gear member 624 and therefore output shaft 19 are rotated at a speed determined by the speed of the sun gear member 622 and the ring gear/sun gear tooth ratio of the planetary gearset 620. The numerical value of the first forward speed ratio is determined by the ring gear/sun gear tooth ratios of the planetary gearsets 620 and 630.

The second forward speed ratio is established with the engagement of the torque-transmitting mechanisms 652 and 658. During the second forward speed ratio, the planet carrier assembly members 636 and 626 are rotated at a speed determined by the speed of the sun gear member 632 and the ring gear/sun gear tooth ratio of the planetary gearset 630. The ring gear member 624 and therefore output shaft 19 are rotated at a speed determined by the speed of the planet carrier assembly member 626 and the ring gear/sun gear tooth ratio of the planetary gearset 620. The numerical value of the second forward speed ratio is determined by the ring gear/sun gear tooth ratios of the planetary gearsets 620 and 630.

The third forward speed ratio is established with the engagement of the torque-transmitting mechanisms 652 and 656. During the third forward speed ratio, the speed of the planet carrier assembly member 636, planet carrier assembly member 626, and ring gear member 644 are rotated at a speed determined by the speed of the sun gear member 632, the speed of the ring gear member 634, and the ring gear/sun gear tooth ratio of the planetary gearset 630. The planet carrier assembly member 646, ring gear member 634, and sun gear member 622 are rotated at a speed determined by the speed of the ring gear member 644 and the ring gear/sun gear tooth ratio of the planetary gearset 640. The ring gear member 624 and therefore output shaft 19 are rotated at a speed determined by the speed of the sun gear member 622, the speed of the planet carrier assembly member 626, and the ring gear/sun gear tooth ratio of the planetary gearset 620. The numerical value of the third forward speed ratio is determined by the ring gear/sun gear tooth ratios of all three planetary gearsets 620, 630, and 640.

The fourth forward speed ratio is established with the engagement of the torque-transmitting mechanisms 652 and 654. During the fourth forward speed ratio, the planet carrier assembly member 646, ring gear member 634, and sun gear member 622 are rotated at a speed determined by the speed of the ring gear member 644 and the ring gear/sun gear tooth ratio of the planetary gearset 640. The planet carrier assembly members 636 and 626 are rotated at a speed determined by the speed of the sun gear member 632, the speed of the ring gear member 634, and the ring gear/sun gear tooth ratio of the planetary gearset 630. The ring gear member 624 and therefore output shaft 19 are rotated at a speed determined by the speed of the planet carrier assembly member 626, the speed of the sun gear member 622, and the ring gear/sun gear tooth ratio of the planetary gearset 620. The numerical value of the fourth forward speed ratio is determined by the ring gear/sun gear tooth ratios of all three planetary gearsets 620, 630, and 640.

The fifth forward speed ratio is established with the engagement of the torque-transmitting mechanisms 650 and 652. During the fifth forward speed ratio, the planetary gearsets 620 and 630, as well as output shaft 19, are rotated in unison with the input shaft 17. Therefore, the numerical value of the fifth forward speed ratio is one.

The sixth forward speed ratio is established with the engagement of the torque-transmitting mechanisms 650 and 654. During the sixth forward speed ratio, the planet carrier assembly member 646 and sun gear member 622 are rotated at a speed determined by the speed of the ring gear member 644 and the ring gear/sun gear tooth ratio of the planetary gearset 640. The ring gear member 624 and therefore output shaft 19 are rotated at a speed determined by the speed of the planet carrier assembly member 626, the speed of the sun gear member 622, and the ring gear/sun gear tooth ratio of the planetary gearset 620. The numerical value of the sixth forward speed ratio is determined by the ring gear/sun gear tooth ratios of the planetary gearsets 640 and 620.

The seventh forward speed ratio is established with the engagement of the torque-transmitting mechanisms 650 and 658. During the seventh forward speed ratio, the ring gear member 624 and therefore output shaft 19 are rotated at a speed determined by the speed of the planet carrier assembly member 626 and the ring gear/sun gear tooth ratio of the planetary gearset 620. The numerical value of the seventh forward speed ratio is determined by the ring gear/sun gear tooth ratio of the planetary gearset 620.

Figures 15, 16:
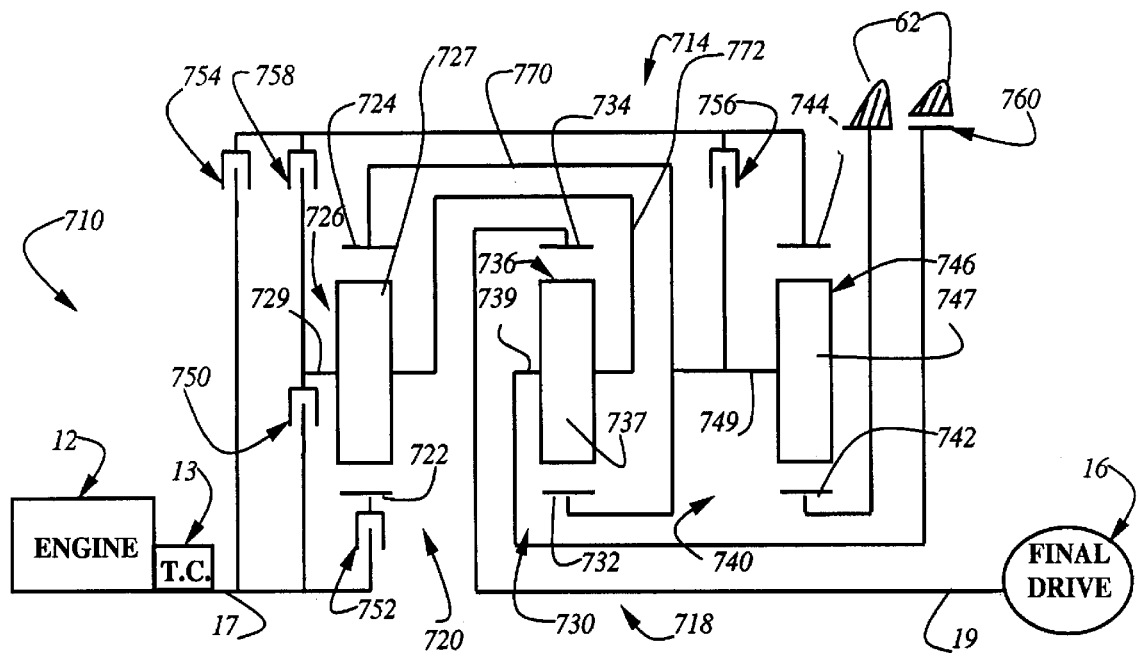
FIG. 15 is a schematic representation of a powertrain having a planetary transmission incorporating another embodiment of the present invention.
FIG. 16 is a truth table and chart providing information regarding the operating parameters of the power transmission shown in FIG. 15.

A powertrain 710 shown in FIG. 15 includes the engine 12, the starting device 13, a planetary transmission 714, and the final drive mechanism 16. The planetary transmission 714 includes the input shaft 17, a planetary gear arrangement 718, and the output shaft 19. The planetary gear arrangement 718 includes three simple planetary gearsets 720, 730, and 740, five rotating type torque-transmitting mechanisms 750, 752, 754, 756, and 758, and one stationary type torque-transmitting mechanism 760.

The simple planetary gearset 720 includes a sun gear member 722, a ring gear member 724, and a planet carrier assembly member 726. The planet carrier assembly member 726 includes a plurality of pinion gear members 727 rotatably mounted on a planet carrier member 729 and disposed in meshing relationship with both the sun gear member 722 and the ring gear member 724.

The simple planetary gearset 730 includes a sun gear member 732, a ring gear member 734, and a planet carrier assembly member 736. The planet carrier assembly member 736 includes a plurality of pinion gear members 737 rotatably mounted on a planet carrier assembly member 739 and disposed in meshing relationship with the sun gear member 732 and the ring gear member 734.

The simple planetary gearset 740 includes a sun gear member 742, a ring gear member 744, and a planet carrier assembly member 746. The planet carrier assembly member 746 includes a plurality of pinion gear members 747 rotatably mounted on a planet carrier member 749 and disposed in meshing relationship with the sun gear member 742 and the ring gear member 744.

The ring gear member 724, sun gear member 732, and planet carrier assembly member 746 are continuously interconnected by an interconnecting member 770. The planet carrier assembly member 726 and planet carrier assembly member 736 are continuously interconnected by an interconnecting member 772. The sun gear member 742 is continuously interconnected with the transmission housing 62. The output shaft 19 is continuously interconnected with the ring gear member 734.

The input shaft 17 is selectively interconnectible with the interconnecting member 772 through the torque-transmitting mechanism 750, selectively interconnectible with the sun gear member 722 through the torque-transmitting mechanism 752, and selectively interconnectible with the ring gear member 744 through the torque-transmitting mechanism 754. The ring gear member 744 is selectively connectible with the interconnecting member 770 through the torque-transmitting mechanism 756, and selectively interconnectible with the interconnecting member 772 through the torque-transmitting mechanism 758. The interconnecting member 772 is selectively interconnectible with the transmission housing 62 through the torque-transmitting mechanism 760.

The torque-transmitting mechanisms are selectively engaged in combinations of two in the sequence shown in the truth table of FIG. 16 in order to establish seven forward speed ratios and one reverse speed ratio between the input shaft 17 and the output shaft 19. The truth table also provides a numerical example of the speed ratios that are available with the planetary gear arrangement 718 when the ring gear/sun gear tooth ratios of the planetary gearsets 720, 730, and 740 are as given in FIG. 16 as R1/S1, R2/S2, and R3/S3, respectively. Also shown in FIG. 16 is a chart providing numerical examples of the ratio steps between adjacent forward speed ratios as well as between the reverse and first forward speed ratio. Also given in the chart is the overall ratio spread of the forward speed ratios. The numerical values of the ratio steps and ratio spread are established by the example speed ratio numbers given in the truth table.

The reverse speed ratio is established with the engagement of the torque-transmitting mechanisms 754 and 760. During the reverse speed ratio, the planet carrier assembly member 746 and sun gear member 732 are rotated at a speed determined by the speed of the ring gear member 744 and the ring gear/sun gear tooth ratio of the planetary gearset 740. The ring gear member 734 and therefore output shaft 19 are rotated at a speed determined by the speed of the sun gear member 732 and the ring gear/sun gear tooth ratio of the planetary gearset 730. The numerical value of the reverse speed ratio is determined by the ring gear/sun gear tooth ratios of the planetary gearsets 730 and 740.

The first forward speed ratio is established with the engagement of the torque-transmitting mechanisms 752 and 760. During the first forward speed ratio, the ring gear member 724 and sun gear member 732 are rotated at a speed determined by the speed of the sun gear member 722 and the ring gear/sun gear tooth ratio of the planetary gearset 720. The ring gear member 734 and therefore output shaft 19 are rotated at a speed determined by the speed of the sun gear member 732 and the ring gear/sun gear tooth ratio of the planetary gearset 730. The numerical value of the first forward speed ratio is determined by the ring gear/sun gear tooth ratios of the planetary gearsets 720 and 730.

The second forward speed ratio is established with the engagement of the torque-transmitting mechanisms 752 and 756. During the second forward speed ratio, the planet carrier assembly members 726 and 736 are rotated at a speed determined by the speed of the sun gear member 722 and the ring gear/sun gear tooth ratio of the planetary gearset 720. The ring gear member 734 and therefore output shaft 19 are rotated at a speed determined by the speed of the planet carrier assembly member 736 and the ring gear/sun gear tooth ratio of the planetary gearset 730. The numerical value of the second forward speed ratio is determined by the ring gear/sun gear tooth ratios of the planetary gearsets 720 and 730.

The third forward speed ratio is established with the engagement of the torque-transmitting mechanisms 752 and 758. During the third forward speed ratio, the ring gear member 724, sun gear member 732, and planet carrier assembly member 746 are rotated at a speed determined by the speed of the sun gear member 722, the speed of the planet carrier assembly member 726, and the ring gear/sun gear tooth ratio of the planetary gearset 720. The ring gear member 744, the planet carrier assembly member 736, and planet carrier assembly member 726 are rotated at a speed determined by the speed of the planet carrier assembly member 746 and the ring gear/sun gear tooth ratio of the planetary gearset 740. The ring gear member 734 and therefore output shaft 19 are rotated at a speed determined by the speed of the planet carrier assembly member 736, the speed of the sun gear member 732, and the ring gear/sun gear tooth ratio of the planetary gearset 730. The numerical value of the third forward speed ratio is determined by the ring gear/sun gear tooth ratios of all three planetary gearsets 720, 730, and 740.

The fourth forward speed ratio is established with the engagement of the torque-transmitting mechanisms 752 and 754. During the fourth forward speed ratio, the planet carrier assembly member 746, sun gear member 732, and ring gear member 724 are rotated at a speed determined by the speed of the ring gear member 744 and the ring gear/sun gear tooth ratio of the planetary gearset 740. The planet carrier assembly members 726 and 736 are rotated at a speed determined by the speed of the sun gear member 722, the speed of the ring gear member 724, and the ring gear/sun gear tooth ratio of the planetary gearset 720. The ring gear member 734 and therefore output shaft 19 are rotated at a speed determined by the speed of the planet carrier assembly member 736, the speed of the sun gear member 732, and the ring gear/sun gear tooth ratio of the planetary gearset 730. The numerical value of the fourth forward speed ratio is determined by the ring gear/sun gear tooth ratios of all three planetary gearsets 720, 730, and 740.

The fifth forward speed ratio is established with the engagement of the torque-transmitting mechanisms 750 and 752. During the fifth forward speed ratio, the input shaft 17, planetary gearsets 720 and 730, and the output shaft 19, rotate in unison. Therefore, the numerical value of the fifth forward speed ratio is one.

The sixth forward speed ratio is established with the engagement of the torque-transmitting mechanisms 750 and 754. During the sixth forward speed ratio, the planet carrier assembly member 746 and sun gear member 732 are rotated at a speed determined by the speed of the ring gear member 744 and the ring gear/sun gear tooth ratio of the planetary gearset 740. The ring gear member 734 and therefore output shaft 19 are rotated at a speed determined by the speed of the planet carrier assembly member 736, the speed of the sun gear member 732, and the ring gear/sun gear tooth ratio of the planetary gearset 730. The numerical value of the sixth forward speed ratio is determined by the ring gear/sun gear tooth ratios of the planetary gearsets 730 and 740.

The seventh forward speed ratio is established with the engagement of the torque-transmitting mechanisms 750 and 756. During the seventh forward speed ratio, the ring gear member 734 and therefore output shaft 19 are rotated at a speed determined by the speed of the planet carrier assembly member 736 and the ring gear/sun gear tooth ratio of the planetary gearset 730. The numerical value of the seventh forward speed ratio is determined by the ring gear/sun gear tooth ratio of the planetary gearset 730.

Figures 17, 18:
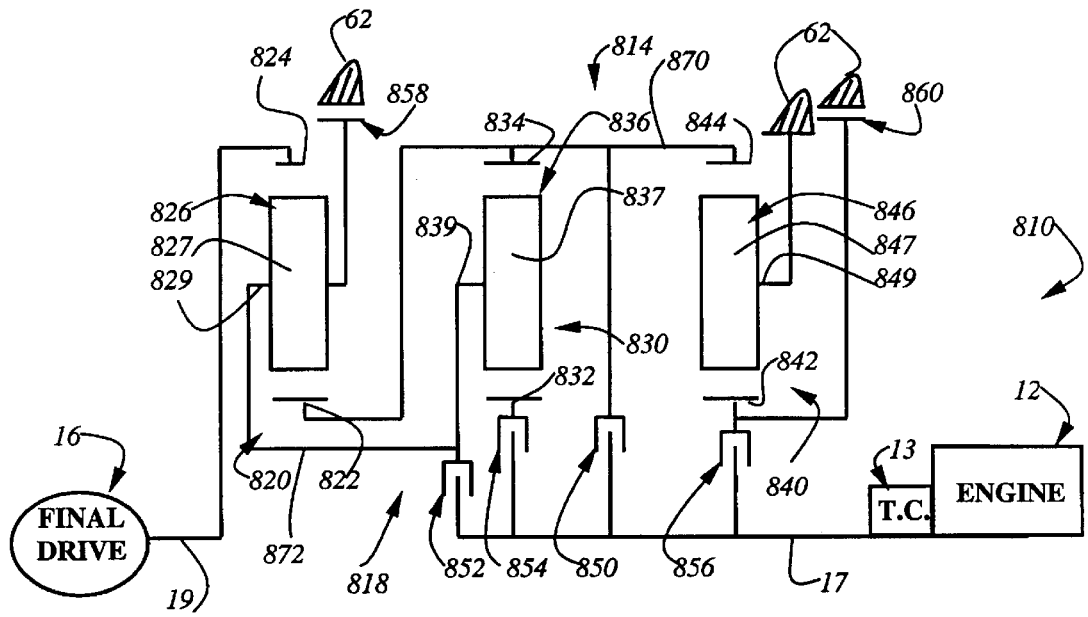
FIG. 17 is a schematic representation of a powertrain having a planetary transmission incorporating another embodiment of the present invention.
FIG. 18 is a truth table and chart providing information regarding the operating parameters of the power transmission shown in FIG. 17.

A powertrain 810 shown in FIG. 17 includes the engine 12, the starting device 13, a planetary transmission 814, and the final drive mechanism 16. The planetary transmission 814 includes the input shaft 17, a planetary gear arrangement 818, and the output shaft 19. The planetary gear arrangement 818 includes three simple planetary gearsets 820, 830, and 840, four rotating type torque-transmitting mechanisms 850, 852, 854, and 856, and two stationary type torque-transmitting mechanisms 858 and 860.

The simple planetary gearset 820 includes a sun gear member 822, a ring gear member 824, and a planet carrier assembly member 826. The planet carrier assembly member 826 includes a plurality of pinion gear members 827 rotatably mounted on a planet carrier member 829 and disposed in meshing relationship with both the sun gear member 822 and the ring gear member 824.

The simple planetary gearset 830 includes a sun gear member 832, a ring gear member 834, and a planet carrier assembly member 836. The planet carrier assembly member 836 includes a plurality of pinion gear members 837 rotatably mounted on a planet carrier assembly member 839 and disposed in meshing relationship with the sun gear member 832 and the ring gear member 834.

The simple planetary gearset 840 includes a sun gear member 842, a ring gear member 844, and a planet carrier assembly member 846. The planet carrier assembly member 846 includes a plurality of pinion gear members 847 rotatably mounted on a planet carrier member 849 and disposed in meshing relationship with the sun gear member 842 and the ring gear member 844.

The sun gear member 822, ring gear member 834, and ring gear member 844 are continuously interconnected by an interconnecting member 870. The planet carrier assembly member 826 and planet carrier assembly member 836 are continuously interconnected by an interconnecting member 872. The planet carrier assembly member 846 is continuously connected with the transmission housing 62. The ring gear member 824 is continuously interconnected with the transmission output shaft 19.

The input shaft 17 is selectively interconnectible with the interconnecting member 872 through the torque-transmitting mechanism 852, selectively connectible with the interconnecting member 870 through the torque-transmitting mechanism 850, selectively connectible with the sun gear member 832 through the torque-transmitting mechanism 854, and selectively interconnectible with the sun gear member 842 through the torque-transmitting mechanism 856. The interconnecting member 872 is selectively interconnectible with the transmission housing 62 through the torque-transmitting mechanism 858. The sun gear member 842 is selectively interconnectible with the transmission housing 62 through the torque-transmitting mechanism 860.

The torque-transmitting mechanisms are selectively engaged in combinations of two, as shown in the truth table of FIG. 18. Also seen in the truth table is the sequence of combinations in order to establish seven forward speed ratios and one reverse speed ratio between the input shaft 17 and the output shaft 19. Further information given in the truth table is a numerical example of the speed ratios that are available with the planetary gear arrangement 818 when the ring gear/sun gear tooth ratios of the planetary gearsets 820, 830, and 840 are as given in FIG. 18 as R1/S1, R2/S2, and R3/S3, respectively. Further information provided in FIG. 18 is by way of a chart, which sets forth the numerical examples of the ratio steps between adjacent forward speed ratios as well as between the reverse and first forward speed ratio. Further information given in the chart is the overall ratio spread of the forward speed ratios.

Those skilled in the art will, upon reviewing the engagement combinations and sequence of engagements, readily determined that the numerical value of the reverse speed ratio is determined by the ring gear/sun gear tooth ratio of the planetary gearset 820. The numerical values of the first and seventh forward speed ratios are determined by the ring gear/sun gear tooth ratios of the planetary gearsets 820 and 840. The numerical value of the second forward speed ratio and the fourth forward speed ratio are determined by the ring gear/sun gear tooth ratios of the planetary gearsets 820 and 830. The numerical value of the third forward speed ratio is determined by the ring gear/sun gear tooth ratios of all three planetary gearsets 820, 830, and 840. The fifth forward speed ratio has a numerical value of one. The numerical value of the sixth forward speed ratio is determined by the ring gear/sun gear tooth ratio of the planetary gearset 820.

Figures 19, 20:
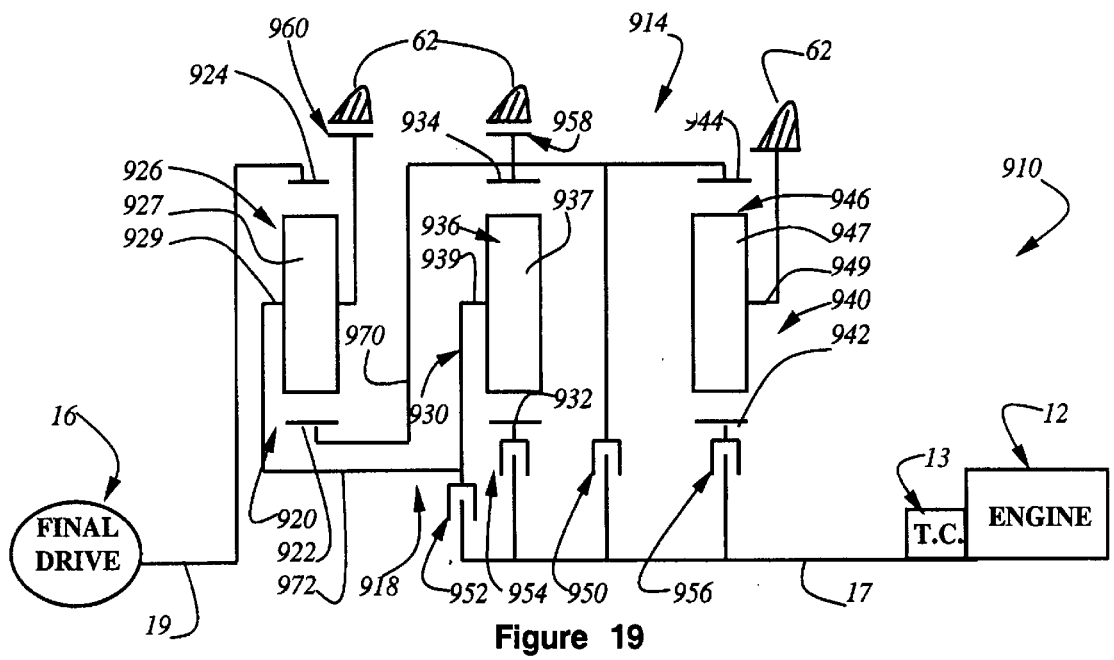
FIG. 19 is a schematic representation of a powertrain having a planetary transmission incorporating another embodiment of the present invention.
FIG. 20 is a truth table and chart providing information regarding the operating parameters of the power transmission shown in FIG. 19.

A powertrain 910 shown in FIG. 19 includes the engine 12, the starting device 13, a planetary transmission 914, and the final drive mechanism 16. The planetary transmission 914 includes the input shaft 17, a planetary gear arrangement 918, and the output shaft 19. The planetary gear arrangement 918 includes three simple planetary gearsets 920, 930, and 940, four rotating type torque-transmitting mechanisms 950, 952, 954, and 956, and two stationary type torque-transmitting mechanisms 958 and 960.

The simple planetary gearset 920 includes a sun gear member 922, a ring gear member 924, and a planet carrier assembly member 926. The planet carrier assembly member 926 includes a plurality of pinion gear members 927 rotatably mounted on a planet carrier member 929 and disposed in meshing relationship with both the sun gear member 922 and the ring gear member 924.

The simple planetary gearset 930 includes a sun gear member 932, a ring gear member 934, and a planet carrier assembly member 936. The planet carrier assembly member 936 includes a plurality of pinion gear members 937 rotatably mounted on a planet carrier assembly member 939 and disposed in meshing relationship with the sun gear member 932 and the ring gear member 934.

The simple planetary gearset 940 includes a sun gear member 942, a ring gear member 944, and a planet carrier assembly member 946. The planet carrier assembly member 946 includes a plurality of pinion gear. members 947 rotatably mounted on a planet carrier member 949 and disposed in meshing relationship with the sun gear member 942 and the ring gear member 944.

The sun gear member 922, ring gear member 934, and ring gear member 944 are continuously interconnected by an interconnecting member 970, which is also selectively connectible with the transmission housing 62 through the torque-transmitting mechanism 958. The planet carrier assembly members 926 and 936 are continuously interconnected by an interconnecting member 972, which is selectively connectible with the transmission housing 62 through the torque-transmitting mechanism 960. The planet carrier assembly member 946 is continuously interconnected with the transmission housing 62. The ring gear member 924 is continuously interconnected with the output shaft 19. The input shaft 17 is selectively interconnectable with the interconnecting member 970 through the torque transmitting mechanism 950, selectively interconnectable with the interconnecting member 972 through the torque transmitting mechanism 952, selectively interconnectable with the sun gear member 932 through the torque transmitting mechanism 954, and selectively interconnectable with the sun gear member 942 through the torque transmitting mechanism 956.

The truth table in FIG. 20 describes the combination of engagements as well as the sequence of engagements for the torque-transmitting mechanisms in order to establish seven forward speed ratios and one reverse speed ratio between the input shaft 17 and the output shaft 19. Also given in the truth table is a numerical example of the speed ratios that are available with the planetary gear arrangement 918 when the ring gear/sun gear tooth ratios of the planetary gearsets 920, 930, and 940 are as given as R1/S1, R2/S2, and R3/S3, respectively. The chart in FIG. 20 provides the numerical value of the ratio steps between adjacent forward speed ratios as well as between the reverse and first forward speed ratio when the example numerical speed ratio values given in the truth table are employed. Also given in the chart is the overall ratio spread of the forward speed ratios.

Those skilled in the art, upon reviewing the engagement combinations and the sequence of engagements within the planetary gear arrangement 918, will recognize that the numerical value of the reverse speed ratio and the sixth forward speed ratio are determined by the ring gear/sun gear tooth ratio of the planetary gearset 920. The numerical value of the first forward speed ratio and the seventh forward speed ratio are determined by the ring gear/sun gear tooth ratios of the planetary gearsets 920 and 940. The numerical value of the second forward speed ratio and the fourth forward speed ratio are determined by the ring gear/sun gear tooth ratios of the planetary gearsets 920 and 930. The numerical value of the third forward speed ratio is determined by the ring gear/sun gear tooth ratios of all three planetary gearsets 920, 930, and 940. The numerical of the fifth forward speed ratio is one.

Figures 21, 22:
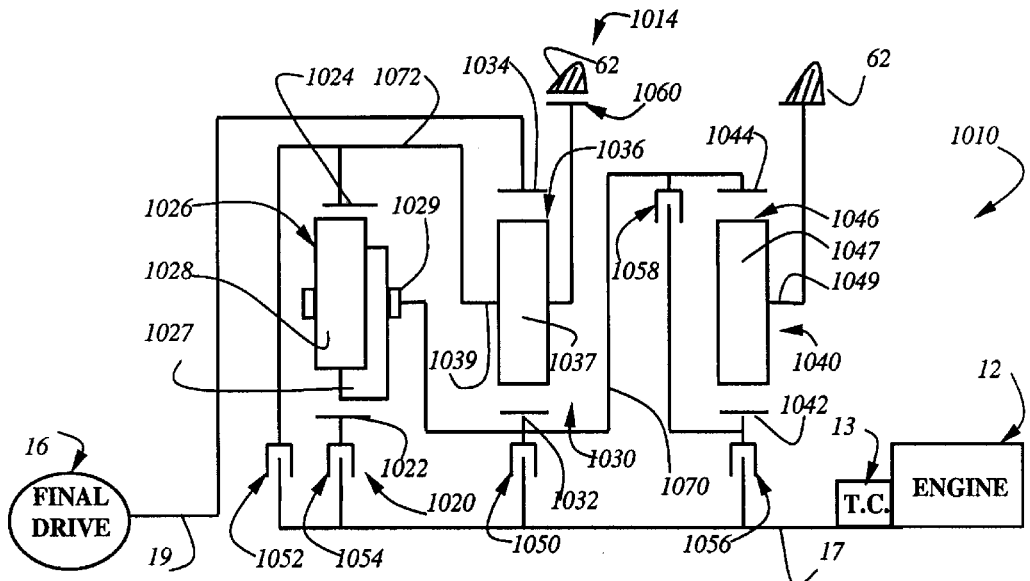
FIG. 21 is a schematic representation of a powertrain having a planetary transmission incorporating another embodiment of the present invention.
FIG. 22 is a truth table and chart providing information regarding the operating parameters of the power transmission shown in FIG. 21.

A powertrain 1010 shown in FIG. 21 includes the engine 12, the starting device 13, a planetary transmission 1014, and the final drive mechanism 16. The planetary transmission 1014 includes the input shaft 17, a planetary gear arrangement 1018, and the output shaft 19. The planetary gear arrangement 1018 includes a compound planetary gearset 1020, a simple planetary gearset 1030, and a simple planetary gearset 1040, as well as five rotating type torque-transmitting mechanisms 1050, 1052, 1054, 1056 and 1058, and one stationary type torque-transmitting mechanism 1060.

The compound planetary gearset 1020 includes a sun gear. member 1022, a ring gear member 1024, and a planet carrier assembly member 1026. The planet carrier assembly member 1026 includes a plurality of intermeshing pairs of pinion gear members 1027 and 1028, which are rotatably mounted on a common planet carrier member 1029 and disposed in meshing relationship with the sun gear member 1022 and the ring gear member 1024, respectively. Those skilled in the art will recognize that the planetary gearset 1020 is a conventional dual pinion or compound type planetary gearset.

The simple planetary gearset 1030 includes a sun gear member 1032, a ring gear member 1034, and a planet carrier assembly member 1036. The planet carrier assembly member 1036 includes a plurality of pinion gear members 1037 rotatably mounted on a planet carrier assembly member 1039 and disposed in meshing relationship with the sun gear member 1032 and the ring gear member 1034.

The simple planetary gearset 1040 includes a sun gear member 1042, a ring gear member 1044, and a planet carrier assembly member 1046. The planet carrier assembly member 1046 includes a plurality of pinion gear members 1047 rotatably mounted on a planet carrier member 1049 and disposed in meshing relationship with the sun gear. member 1042 and the ring gear member 1044.

The planet carrier assembly member 1026, sun gear member 1032, and ring gear member 1044 are continuously interconnected by an interconnecting member 1070, which is selectively connectible with the sun gear member 1042 through the torque-transmitting mechanism 1058. The ring gear member 1024 and planet carrier assembly member 1036 are continuously interconnected by an interconnecting member 1072, which is selectively connectible with the transmission housing 62 through the torque-transmitting mechanism 1060. The planet carrier assembly member 1046 is continuously interconnected with the transmission housing 62. The ring gear member 1034 is continuously interconnected with the output shaft 19.

The input shaft 17 is selectively connectible with the interconnecting member 1070 through the torque-transmitting mechanism 1050, selectively connectible with the interconnecting member 1072 through the torque-transmitting mechanism 1052, selectively interconnectible with the sun gear member 1022 through the torque-transmitting mechanism 1054, and selectively interconnectible with the sun gear member 1042 through the torque-transmitting mechanism 1056.

The torque-transmitting mechanisms are selectively engaged in combinations of two as shown in the truth table of FIG. 22. The truth table in FIG. 22 describes the combination of engagements as well as the sequence of engagements for the torque-transmitting mechanisms in order to establish seven forward speed ratios and one reverse speed ratio between the input shaft 17 and the output shaft 19 in the planetary gear arrangement 1018. Also given in the truth table is a numerical example of the speed ratios that are available with the planetary gear arrangement 1018 when the ring gear/sun gear tooth ratios of the planetary gearsets 1020, 1030, and 1040 are as given in FIG. 22 as R1/S1, R2/S2, and R3/S3, respectively. The chart in FIG. 22 provides a numerical value of the ratio steps between adjacent forward speed ratios as well as between the reverse and first forward speed ratio when the example speed ratios given in the truth table are employed. The chart also provides the numerical value for the overall ratio spread of the forward speed ratios.

Those skilled in the art, upon reviewing the combinations of engagements and the connections made thereby within the planetary gear arrangement 1018, will appreciate that the numerical value of the reverse speed ratio and the sixth forward speed ratio are determined by the ring gear/sun gear tooth ratio of the planetary gearset 1030. The numerical value of the first forward speed ratio and the seventh forward speed ratio are determined by the ring gear/sun gear tooth ratios of the planetary gearsets 1030 and 1040. The numerical value of the second forward speed ratio and the fourth forward speed ratio are determined by the ring gear/sun gear tooth ratios of the planetary gearsets 1020 and 1030. The numerical value of the third forward speed ratio is determined by the ring gear/sun gear tooth ratios of all three planetary gearsets 1020, 1030, and 1040. The numerical value of the fifth forward speed ratio is one.

Figures 23, 24:
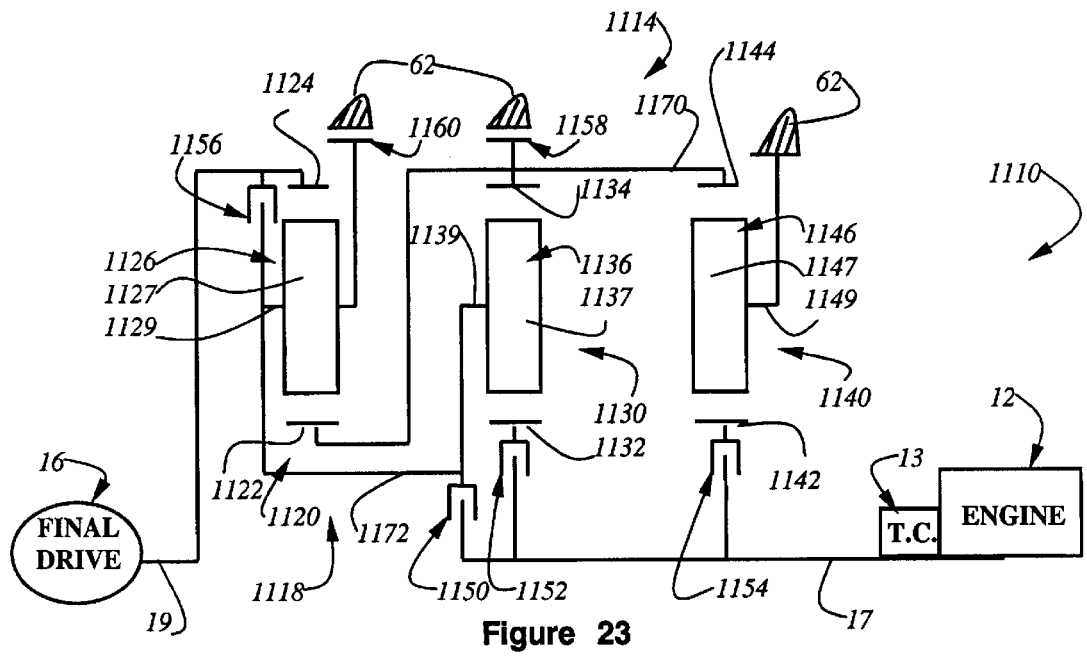
FIG. 23 is a schematic representation of a powertrain having a planetary transmission incorporating another embodiment of the present invention.
FIG. 24 is a truth table and chart providing information regarding the operating parameters of the power transmission shown in FIG. 23.

A powertrain 1110 shown in FIG. 23 includes the engine 12, the starting device 13, a planetary transmission 1114, and the final drive mechanism 16. The planetary transmission 1114 includes the input shaft 17, a planetary gear arrangement 1118, and the output shaft 19. The planetary gear arrangement 1118 includes three simple planetary gearsets 1120, 1130, and 1140, four rotating type torque-transmitting mechanisms 1150, 1152, 1154, and 1156, and two stationary type torque-transmitting mechanisms 1158 and 1160.

The simple planetary gearset 1120 includes a sun gear member 1122, a ring gear member 1124, and a planet carrier assembly member 1126. The planet carrier assembly member 1126 includes a plurality of pinion gear members 1127 rotatably mounted on a planet carrier member 1129 and disposed in meshing relationship with both the sun gear member 1122 and the ring gear member 1124.

The simple planetary gearset 1130 includes a sun gear member 1132, a ring gear member 1134, and a planet carrier assembly member 1136. The planet carrier assembly member 1136 includes a plurality of pinion gear members 1137 rotatably mounted on a planet carrier assembly member 1139 and disposed in meshing relationship with the sun gear member 1132 and the ring gear member 1134.

The simple planetary gearset 1140 includes a sun gear member 1142, a ring gear member 1144, and a planet carrier assembly member 1146. The planet carrier assembly member 1146 includes a plurality of pinion gear members 1147 rotatably mounted on a planet carrier member 1149 and disposed in meshing relationship with the sun gear member 1142 and the ring gear member 1144.

The sun gear member 1122 is continuously interconnected with the ring gear member 1134 and the ring gear member 1144 through an interconnecting member 1170. The planet carrier assembly members 1126 and 1136 are continuously interconnected through an interconnecting member 1172. The planet carrier assembly member 1146 is continuously interconnected with the transmission housing 62. The ring gear member 1124 is continuously interconnected with the transmission output shaft 19, and selectively interconnected with the interconnecting member 1172 through the torque-transmitting mechanism 1156.

The input shaft 17 is selectively interconnected with the interconnecting member 1172 through the torque-transmitting mechanism 1150, selectively interconnectible with the sun gear member 1132 through the torque-transmitting mechanism 1152, and selectively interconnectible with sun gear member 1142 through the torque-transmitting mechanism 1154. The interconnecting member 1170 is selectively connectible with the transmission housing 62 through the torque-transmitting mechanism 1158. The interconnecting member 1172 is selectively interconnectible with the transmission housing 62 through the torque-transmitting mechanism 1160.

The torque-transmitting mechanisms are selectively engaged in combinations of two as shown in the truth table of FIG. 24. The truth table also provides the sequence of engagements in order to establish seven forward speed ratios and one reverse speed ratio in the planetary gear arrangement 1118 between in the input shaft 17 and the output shaft 19. The truth table of FIG. 24 also provides a numerical example of the speed ratios that are available with the planetary gear arrangement 1118 when the ring gear/sun gear tooth ratios of the planetary gearsets 1120, 1130, and 1140 are as given in FIG. 24 as R1/S1, R2/S2, and R3/S3, respectively. The chart in FIG. 24 provides numerical examples of the ratio steps between adjacent forward speed ratios as well as between the reverse and first forward speed ratio when the given speed ratios are employed. Further information given in the chart of FIG. 24 is the overall ratio spread of the forward speed ratios.

Upon reviewing the engagement combinations and the connections made thereby within the planetary gear arrangement 1118, those skilled in the art will recognize that the reverse speed ratio is determined by the ring gear/sun gear tooth ratio of the planetary gearset 1140. The numerical value of the first forward speed ratio and the seventh forward speed ratio are determined by the ring gear/sun gear tooth ratios of the planetary gearsets 1130 and 1140. The numerical value of the second forward speed ratio and the fourth forward speed ratio are determined by the ring gear/sun gear tooth ratios of the planetary gearsets 1120 and 1130. The numerical value of the third forward speed ratio is determined by the ring gear/sun gear tooth ratios of all three planetary gearsets 1120, 1130, and 1140. The numerical of the fifth forward speed ratio is one. The numerical value of the sixth forward speed ratio is determined by the ring gear/sun gear tooth ratio of the planetary gearset 1120.

Figures 25, 26:
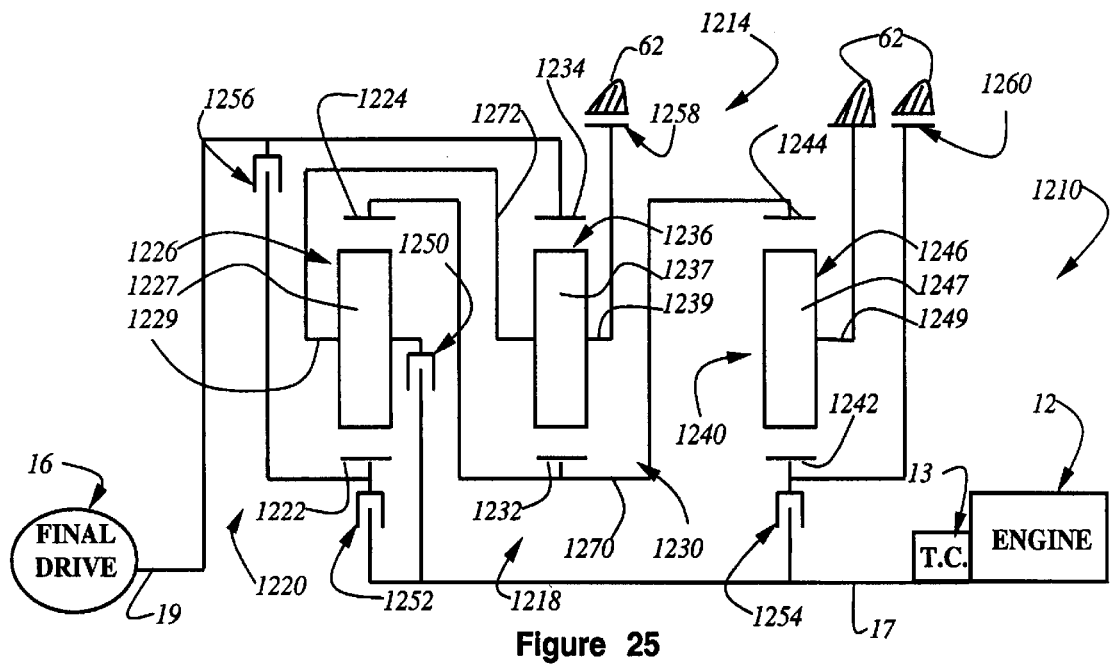
FIG. 25 is a schematic representation of a powertrain having a planetary transmission incorporating another embodiment of the present invention.
FIG. 26 is a truth table and chart providing information regarding the operating parameters of the power transmission shown in FIG. 25.

A powertrain 1210 shown in FIG. 25 includes the engine 12, the starting device 13, a planetary transmission 1214, and the final drive mechanism 16. The planetary transmission 1214 includes the input shaft 17, a planetary gear arrangement 1218, and the output shaft 19. The planetary gear arrangement 1218 includes three simple planetary gearsets 1220, 1230, and 1240, four rotating type torque-transmitting mechanisms 1250, 1252, 1254, and 1256, and two stationary type torque-transmitting mechanisms 1258 and 1260.

The simple planetary gearset 1220 includes a sun gear member 1222, a ring gear member 1224, and a planet carrier assembly member 1226. The planet carrier assembly member 1226 includes a plurality of pinion gear members 1227 rotatably mounted on a planet carrier member 1229 and disposed in meshing relationship with both the sun gear member 1222 and the ring gear member 1224.

The simple planetary gearset 1230 includes a sun gear member 1232, a ring gear member 1234, and a planet carrier assembly member 1236. The planet carrier assembly member 1236 includes a plurality of pinion gear members 1237 rotatably mounted on a planet carrier assembly member 1239 and disposed in meshing relationship with the sun gear member 1232 and the ring gear member 1234.

The simple planetary gearset 1240 includes a sun gear member 1242, a ring gear member 1244, and a planet carrier assembly member 1246. The planet carrier assembly member 1246 includes a plurality of pinion gear members 1247 rotatably mounted on a planet carrier member 1249 and disposed in meshing relationship with the sun gear member 1242 and the ring gear member 1244.

The ring gear member 1224, sun,gear member 1232, and ring gear member 1244 are continuously interconnected by an interconnecting member 1270. The planet carrier assembly member 1226 and planet carrier assembly member 1236 are continuously interconnected by an interconnecting member 1272. The planet carrier assembly member 1246 is continuously interconnected with the transmission housing 62. The ring gear member 1234 is continuously interconnected with the output shaft 19.

The input shaft 17 is selectively interconnectible with the interconnecting member 1272 through the torque-transmitting mechanism 1250, selectively interconnectible with the sun gear member 1222 through the torque-transmitting mechanism 1252, and selectively interconnectible with the sun gear member 1242 through the torque-transmitting mechanism 1254. The sun gear member 1222 is selectively interconnectible with the ring gear member 1234 and therefore output shaft 19 through the torque-transmitting mechanism 1256. The interconnecting member 1272 is selectively interconnectible with the transmission housing 62 through the torque-transmitting mechanism 1258. The sun gear member 1242 is selectively interconnectible with the transmission housing 62 through the torque-transmitting mechanism 1260.

The torque-transmitting mechanisms are selectively engaged in combinations of two, as shown in the truth table of FIG. 26. When the sequence of engagements shown in the truth table are followed, the planetary gear arrangement 1218 will produce seven forward speed ratios and one reverse speed ratio between the input shaft 17 and the output shaft 19. Further information given in the truth table is a numerical example of the speed ratios that are available with the planetary gear arrangement 1218 when the ring gear/sun gear tooth ratios of the planetary gearsets 1220, 1230, and 1240 are as shown in FIG. 26 as R1/S1, R2/S2, and R3/S3, respectively. A chart in FIG. 26 provides further information for the planetary gear arrangement 1218. The chart provides a numerical example of the ratio steps between adjacent forward speed ratios as well as between the reverse and first forward speed ratio when the given numerical speed ratios are employed. The overall ratio spread of the forward speed ratios is also given in the chart of FIG. 26.

Upon reviewing the engagement combinations and the connections made in the planetary gear arrangement 1218, those skilled in the art will recognize that the numerical value of the reverse speed ratio is determined by the ring gear/sun gear tooth ratio of the planetary gearset 1240. The numerical value of the first forward speed ratio and seventh forward speed ratio are determined by the ring gear/sun gear tooth ratios of the planetary gearsets 1230 and 1240. The numerical value of the second forward speed ratio and the fourth forward speed ratio are determined by the ring gear/sun gear tooth ratios of the planetary gearsets 1220 and 1230. The numerical value of the third forward speed ratio is determined by the ring gear/sun gear tooth ratios of all three planetary gearsets 1220, 1230, and 1240. The fifth forward speed ratio has a numerical value of one. The numerical value of the sixth forward speed ratio is determined by the ring gear/sun gear tooth ratio of the planetary gearset 1230.

Figures 27, 28:
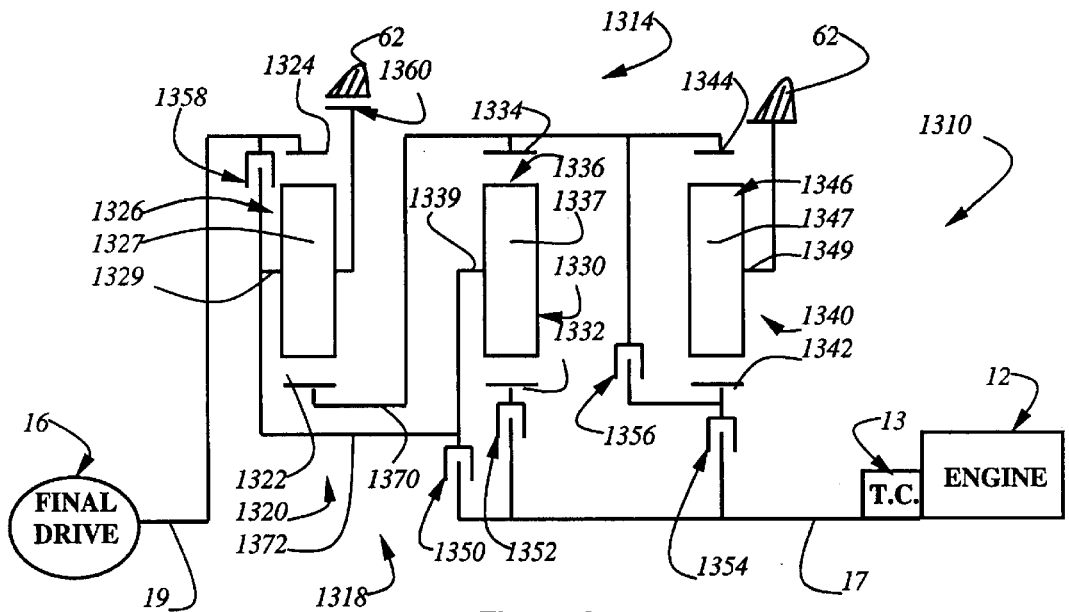
FIG. 27 is a schematic representation of a powertrain having a planetary transmission incorporating another embodiment of the present invention.
FIG. 28 is a truth table and chart providing information regarding the operating parameters of the power transmission shown in FIG. 27.

A powertrain 1310 shown in FIG. 27 includes the engine 12, the starting device 13, a planetary transmission 1314, and the final drive mechanism 16. The planetary transmission 1314 includes the input shaft 17, a planetary gear arrangement 1318, and the output shaft 19. The planetary gear arrangement 1318 includes three simple planetary gearsets 1320, 1330, and 1340, five rotating type torque-transmitting mechanisms 1350, 1352, 1354, 1356, and 1358, and one stationary type torque-transmitting mechanism 1360.

The simple planetary gearset 1320 includes a sun gear member 1322, a ring gear member 1324, and a planet carrier assembly member 1326. The planet carrier assembly member 1326 includes a plurality of pinion gear members 1327 rotatably mounted on a planet carrier member 1329 and disposed in meshing relationship with both the sun gear member 1322 and the ring gear member 1324.

The simple planetary gearset 1330 includes a sun gear member 1332, a ring gear member 1334, and a planet carrier assembly member 1336. The planet carrier assembly member 1336 includes a plurality of pinion gear members 1337 rotatably mounted on a planet carrier assembly member 1339 and disposed in meshing relationship with the sun gear member 1332 and the ring gear member 1334.

The simple planetary gearset 1340 includes a sun gear member 1342, a ring gear member 1344, and a planet carrier assembly member 1346. The planet carrier assembly member 1346 includes a plurality of pinion gear members 1347 rotatably mounted on a planet carrier member 1349 and disposed in meshing relationship with the sun gear member 1342 and the ring gear member 1344.

The sun gear member 1322, ring gear member 1334, and ring gear member 1344 are continuously interconnected by an interconnecting member 1370. The planet carrier assembly member 1326 and planet carrier assembly member 1336 are continuously interconnected by an interconnecting member 1372. The planet carrier assembly member 1346 is continuously connected with the transmission housing 62. The ring gear member 1324 is continuously interconnected with the output shaft 19.

The input shaft 17 is selectively interconnectible with the interconnecting member 1370 through the torque-transmitting mechanism 1350, selectively interconnectible with the sun gear member 1332 through the torque-transmitting mechanism 1352, and selectively interconnectible with the sun gear member 1342 through the torque-transmitting mechanism 1354. The sun gear member 1342 is selectively interconnectible with the interconnecting member 1372 through the torque-transmitting mechanism 1356. The interconnecting member 1372 is selectively interconnectible with the ring gear member 1324 and the output shaft 19 through the torque-transmitting mechanism 1358. The interconnecting member 1372 is selectively interconnectible with the transmission housing 62 through the torque-transmitting mechanism 1360.

The torque-transmitting mechanisms are selectively engaged in combinations of two, as shown in the truth table of FIG. 28. The truth table also shows the sequence of engagements in order to establish seven forward speed ratios and one reverse speed ratio between the input shaft 17 and the output shaft 19. A numerical example of the ring gear/sun gear tooth ratios that are available with the planetary gear arrangement 1318 is also given in the truth table.

These numerical values are determined by the ring gear/sun gear tooth ratios of the planetary gearsets 1320, 1330, and 1340, which are represented in FIG. 28 as R1/S1, R2/S2, and R3/S3, respectively. A chart in FIG. 28 provides the numerical example of the ratio steps between adjacent forward speed ratios as well as between the reverse and first forward speed ratio. Also given in the chart is the overall ratio spread of the forward speed ratios. These numerical values are determined by the speed ratio numerical examples given in the truth table.

Those skilled in the art, upon reviewing the engagement combinations and the connections made thereby within the planetary gear arrangement 1318, will recognize that the numerical value of the reverse speed ratio is determined by ring gear/sun gear tooth ratio of the planetary gearset 1340. The numerical value of the first forward speed ratio and the seventh forward speed ratio are determined by the ring gear/sun gear tooth ratios of the planetary gearsets 1320 and 1340. The numerical value of the second forward speed ratio and the fourth forward speed ratio are determined by the ring gear/sun gear tooth ratios of the planetary gearsets 1320 and 1330. The numerical value of the third forward speed ratio is determined by the ring gear/sun gear tooth ratios of all three planetary gearsets 1320, 1330, and 1340. The numerical value of the fifth forward speed ratio is one. The numerical value of the sixth forward speed ratio is determined by the ring gear/sun gear tooth ratio of the planetary gearset 1320.

Figures 29, 30:
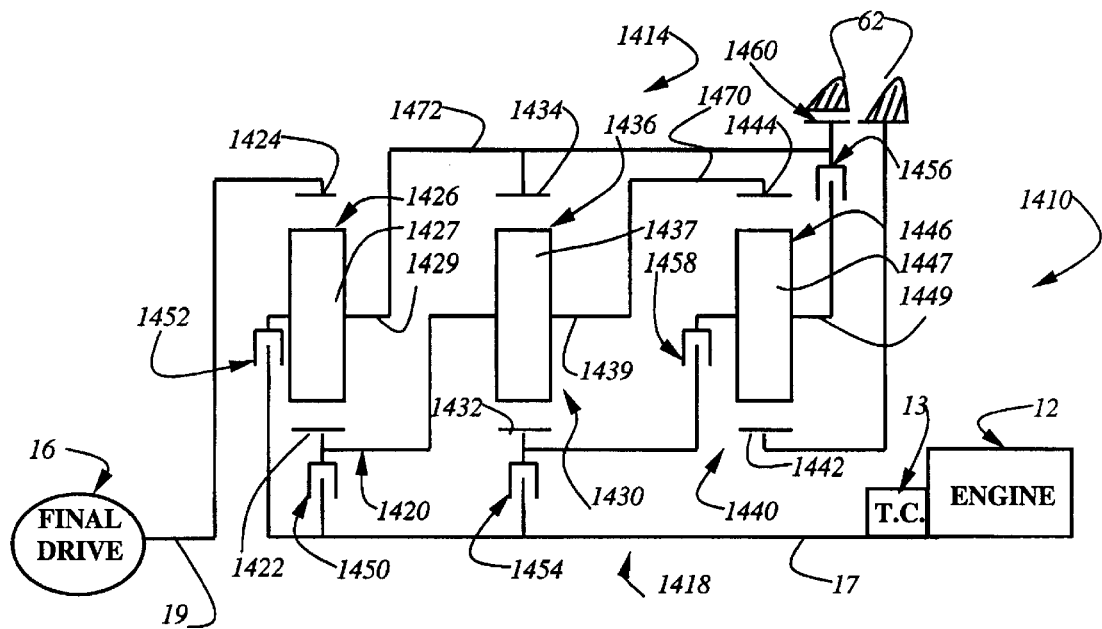
FIG. 29 is a schematic representation of a powertrain having a planetary transmission incorporating another embodiment of the present invention.
FIG. 30 is a truth table and chart providing information regarding the operating parameters of the power transmission shown in FIG. 29.

A powertrain 1410 shown in FIG. 29 includes the engine 12, the starting device 13, a planetary transmission 1414, and the final drive mechanism 16. The planetary transmission 1414 includes the input shaft 17, a planetary gear arrangement 1418, and the output shaft 19. The planetary gear arrangement 1418 includes three simple planetary gearsets 1420, 1430, and 1440, five rotating type torque-transmitting mechanisms 1450, 1452, 1454, 1456, and 1458, and one stationary type torque-transmitting mechanism 1460.

The simple planetary gearset 1420 includes a sun gear member 1422, a ring gear member 1424, and a planet carrier assembly member 1426. The planet carrier assembly member 1426 includes a plurality of pinion gear members 1427 rotatably mounted on a planet carrier member 1429 and disposed in meshing relationship with both the sun gear member 1422 and the ring gear member 1424.

The simple planetary gearset 1430 includes a sun gear member 1432, a ring gear member 1434, and a planet carrier assembly member 1436. The planet carrier assembly member 1436 includes a plurality of pinion gear members 1437 rotatably mounted on a planet carrier assembly member 1439 and disposed in meshing relationship with the sun gear member 1432 and the ring gear member 1434.

The simple planetary gearset 1440 includes a sun gear member 1442, a ring gear member 1444, and a planet carrier assembly member 1446. The planet carrier assembly member 1446 includes a plurality of pinion gear members 1447 rotatably mounted on a planet carrier member 1449 and disposed in meshing relationship with the sun gear member 1442 and the ring gear member 1444.

The sun gear member 1422, planet carrier assembly member 1436, and ring gear member 1444 are continuously interconnected by an interconnecting member 1470. The planet carrier assembly member 1426 and ring gear member 1434 are continuously interconnected by an interconnecting member 1472. The sun gear member 1442 is continuously interconnected with the transmission housing 62. The ring gear member 1424 and output shaft 19 are continuously interconnected.

The input shaft 17 is selectively interconnectible with the interconnecting member 1470 through the torque-transmitting mechanism 1450, selectively interconnectible with the interconnecting member 1472 through the torque-transmitting mechanism 1452, and selectively interconnectible with the sun gear member 1432 through the torque-transmitting mechanism 1454. The interconnecting member 1472 is selectively interconnectible with the planet carrier assembly member 1446 through the torque-transmitting mechanism 1456, and selectively interconnectible with the transmission housing 62 through the torque-transmitting mechanism 1460. The sun gear member 1432 and the planet carrier assembly member 1446 are selectively interconnectible through the torque-transmitting mechanism 1458.

The torque-transmitting mechanisms are selectively engaged in combinations of two, as shown in the truth table of FIG. 30. Following the sequence of engagements shown in the truth table, seven forward speed ratios and one reverse speed ratio are available within the planetary gear arrangement 1418 between the input shaft 17 and the output shaft 19. The truth table provides an example of the numerical values of the speed ratios that are available when the ring gear/sun gear tooth ratios of the planetary gearsets 1420, 1430, and 1440 are given as R1/S1, R2/S2, and R3/S3, respectively. Further information provided in FIG. 30 is by way of a chart in which the numerical value for the ratio steps between the reverse and first forward speed ratio, and the adjacent forward speed ratios are provided. The overall ratio spread of the forward speed ratios is also given in the chart.

Upon reviewing the engagement combinations and the connections made thereby within the planetary gear arrangement 1418, those skilled in the art will recognize that the numerical value of the reverse speed ratio is determined by the ring gear/sun gear tooth ratios of the planetary gearsets 1420 and 1430. The numerical value of the first forward speed ratio, the fifth forward speed ratio, the sixth forward speed ratio, and the seventh forward speed ratio are all determined by the ring gear/sun gear tooth ratios of all three planetary gearsets 1420, 1430, and 1440. The numerical value of the second forward speed ratio and the third forward speed ratio are determined by the ring gear/sun gear tooth ratios of the planetary gearsets 1420 and 1440. The numerical value of the fourth forward speed ratio is one.

Figures 31, 32:
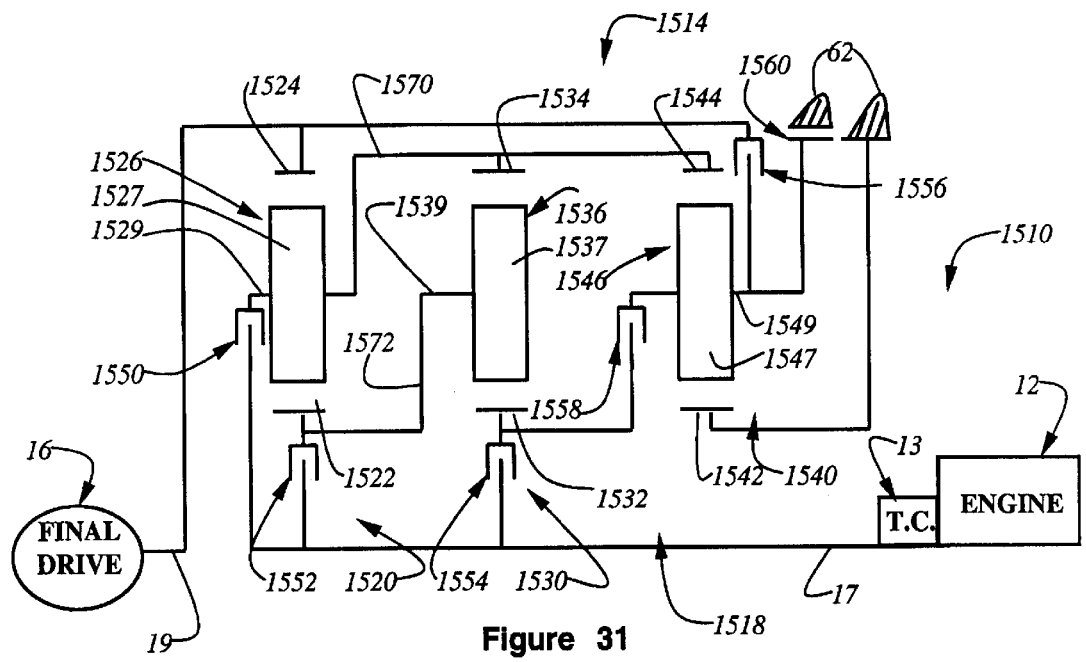
FIG. 31 is a schematic representation of a powertrain having a planetary transmission incorporating another embodiment of the present invention.
FIG. 32 is a truth table and chart providing information regarding the operating parameters of the power transmission shown in FIG. 31.

A powertrain 1510 shown in FIG. 31 includes the engine 12, the starting device 13, a planetary transmission 1514, and the final drive mechanism 16. The planetary transmission 1514 includes the input shaft 17, a planetary gear arrangement 1518, and the output shaft 19. The planetary gear arrangement 1518 includes three simple planetary gearsets 1520, 1530, and 1540, five rotating type torque-transmitting mechanisms 1550, 1552, 1554, 1556, and 1558, and one stationary type torque-transmitting mechanism 1560.

The simple planetary gearset 1520 includes a sun gear member 1522, a ring gear member 1524, and a planet carrier assembly member 1526. The planet carrier assembly member 1526 includes a plurality of pinion gear members 1527 rotatably mounted on a planet carrier member 1529 and disposed in meshing relationship with both the sun gear member 1522 and the ring gear member 1524.

The simple planetary gearset 1530 includes a sun gear member 1532, a ring gear member 1534, and a planet carrier assembly member 1536. The planet carrier assembly member 1536 includes a plurality of pinion gear members 1537 rotatably mounted on a planet carrier assembly member 1539 and disposed in meshing relationship with the sun gear member 1532 and the ring gear member 1534.

The simple planetary gearset 1540 includes a sun gear member 1542, a ring gear member 1544, and a planet carrier assembly member 1546. The planet carrier assembly member 1546 includes a plurality of pinion gear members 1547 rotatably mounted on a planet carrier member 1549 and disposed in meshing relationship with the sun gear member 1542 and the ring gear member 1544.

The planet carrier assembly member 1526 is continuously interconnected with the ring gear member 1534 and the ring gear member 1544 through an interconnecting member 1570. The sun gear member 1522 and planet carrier assembly member 1536 are continuously interconnected through an interconnecting member 1572. The sun gear member 1542 is continuously interconnected with the transmission housing 62. The ring gear member 1524 and output shaft 19 are continuously interconnected.

The input shaft 17 is selectively interconnectible with the interconnecting member 1570 through the torque-transmitting mechanism 1550, selectively interconnectible with the interconnecting member 1572 through the torque-transmitting mechanism 1552, and selectively interconnectible with the sun gear member 1532 through the torque-transmitting mechanism 1554. The planet carrier assembly member 1546 is selectively interconnectible with the ring gear member 1524 and output shaft 19 through the torque-transmitting mechanism 1556, and selectively interconnectible with the sun gear member 1532 through the torque-transmitting mechanism 1558, and selectively interconnectible with the transmission housing 62 through the torque-transmitting mechanism 1560.

The torque-transmitting mechanisms are engaged in combinations of two, as shown in the truth table of FIG. 32, in order to provide seven forward speed ratios and one reverse speed ratio between the input shaft 17 and the output shaft 19. An example of the numerical values that are available with these speed ratios is given in the truth table. These numerical values are determined utilizing the ring gear/sun gear tooth ratios of the planetary gearsets 1520, 1530, and 1540, which are represented by R1/S1, R2/S2, and R3/S3, respectively. A chart in FIG. 32 depicts the numerical value for the ratio steps between adjacent forward speed ratios as well as between the reverse and first forward speed ratio. Also given in the chart is the numerical value for the overall ratio spread of the forward speed ratios. These numerical values are determined by speed ratio values given in the truth table.

Upon reviewing the engagement combinations and the connections made thereby within the planetary gear arrangement 1518, those skilled in the art will recognize that the numerical value of the reverse speed ratio is determined by the ring gear/sun gear tooth ratios of the planetary gearsets 1520 and 1530. The numerical value of the first forward speed ratio, the fifth forward speed ratio, the sixth forward speed ratio, and the seventh forward speed ratio are all determined by the ring gear/sun gear tooth ratios of all three planetary gearsets 1520, 1530, and 1540. The numerical value of the second forward speed ratio is determined by the ring gear/sun gear tooth ratios of the planetary gearsets 1520 and 1540. The numerical value of the third forward speed ratio is determined by the ring gear/sun gear tooth ratio of the planetary gearset 1540. The numerical value of the fourth forward speed ratio is one.

Figures 33, 34:
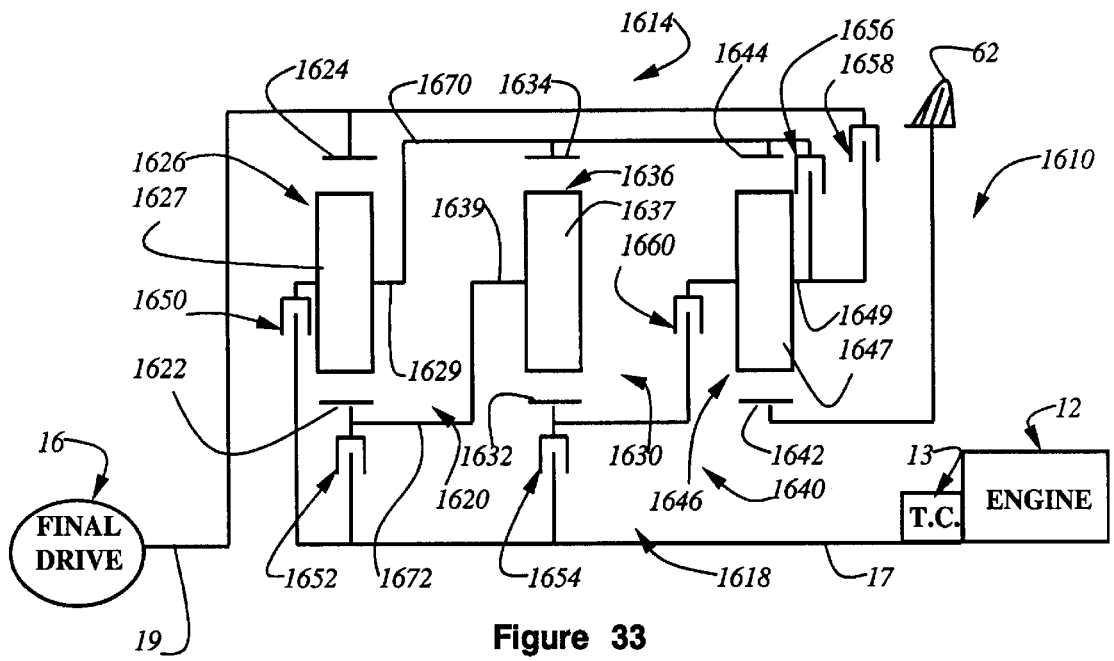
FIG. 33 is a schematic representation of a powertrain having a planetary transmission incorporating another embodiment of the present invention.
FIG. 34 is a truth table and chart providing information regarding the operating parameters of the power transmission shown in FIG. 33.

A powertrain 1610 shown in FIG. 33 includes the engine 12, the starting device 13, a planetary transmission 1614, and the final drive mechanism 16. The planetary transmission 1614 includes the input shaft 17, a planetary gear arrangement 1618, and the output shaft 19. The planetary gear arrangement 1618 includes three simple planetary gearsets 1620, 1630, and 1640, and six rotating type torque-transmitting mechanisms 1650, 1652, 1654, 1656, 1658 and 1660.

The simple planetary gearset 1620 includes a sun gear member 1622, a ring gear member 1624, and a planet carrier assembly member 1626. The planet carrier assembly member 1626 includes a plurality of pinion gear members 1627 rotatably mounted on a planet carrier member 1629 and disposed in meshing relationship with both the sun gear member 1622 and the ring gear member 1624.

The simple planetary gearset 1630 includes a sun gear member 1632, a ring gear member 1634, and a planet carrier assembly member 1636. The planet carrier assembly member 1636 includes a plurality of pinion gear members 1637 rotatably mounted on a planet carrier assembly member 1639 and disposed in meshing relationship with the sun gear member 1632 and the ring gear member 1634.

The simple planetary gearset 1640 includes a sun gear member 1642, a ring gear member 1644, and a planet carrier assembly member 1646. The planet carrier assembly member 1646 includes a plurality of pinion gear members 1647 rotatably mounted on a planet carrier member 1649 and disposed in meshing relationship with the sun gear member 1642 and the ring gear member 1644.

The planet carrier assembly member 1626, ring gear member 1634, and ring gear member 1644 are continuously interconnected by an interconnecting member 1670. The sun gear member 1622 and planet carrier assembly member 1636 are continuously interconnected by an interconnecting member 1672. The sun gear member 1642 is continuously interconnected with the transmission housing 62. The ring gear member 1624 and output shaft 19 are continuously interconnected.

The input shaft 17 is selectively interconnectible with the interconnecting member 1670 through the torque-transmitting mechanism 1650, selectively interconnectible with the interconnecting member 1672 through the torque-transmitting mechanism 1652, and selectively interconnectible with the sun gear member 1632 through the torque-transmitting mechanism 1654. The planet carrier assembly member 1646 is selectively interconnectible with the interconnecting member 1670 through the torque-transmitting mechanism 1656, selectively interconnectible with the ring gear member 1624 and output shaft 19 through the torque-transmitting mechanism 1658, and selectively interconnectible with the sun gear member 1632 through the torque-transmitting mechanism 1660.

The torque-transmitting mechanisms are engaged in combinations of two, as shown in the truth table of FIG. 34. Also shown in the truth table is the sequence of combinations, which will provide seven forward speed ratios and one reverse speed ratio between the input shaft 17 and the output shaft 19. A numerical example for each of the speed ratios is given in the truth table. These numerical examples are determined by the ring gear/sun gear tooth ratios of the planetary gearsets 1620, 1630, and 1640, which are depicted in FIG. 34 as R1/S1, R2/S2, and R3/S3, respectively. A chart in FIG. 34 gives the numerical value for the ratio steps between adjacent forward speed ratios as well as between the reverse and first forward speed ratio. Also given in the chart is the overall ratio spread of the forward speed ratios. These numerical values are determined from the numerical values of the speed ratios given in the truth table.

Upon reviewing the engagement combinations and the connections made thereby within the planetary gear arrangement 1618, those skilled in the art will recognize that the numerical value of the reverse speed ratio is determined by the ring gear/sun gear tooth ratios of the planetary gearsets 1620 and 1630. The first forward speed ratio, fifth forward speed ratio, sixth forward speed ratio, and seventh forward speed ratio all have numerical values determined by the ring gear/sun gear tooth ratios of all three planetary gearsets 1620, 1630, and 1640. The numerical value of the second forward speed ratio is determined by the ring gear/sun gear tooth ratios of the planetary gearsets 1620 and 1640. The numerical value of the third forward speed ratio is determined by the ring gear/sun gear tooth ratio of the planetary gearset 1640. The numerical value of the fourth forward speed ratio is one.

From the above description of the various family members, it should be evident that the families consist of three planetary gearsets, each of which has one member continuously interconnected. Two of the planetary gearsets have another member continuously interconnected. One of the members of one of the planetary gearsets is continuously interconnected with the transmission housing and another of the planetary members is continuously interconnected with transmission output shaft.

A plurality of torque-transmitting mechanisms are provided, three of which selectively connect the transmission input shaft with either the interconnected members or single members of the planetary gearsets. The remaining torque-transmitting mechanisms establish their interconnections either between the input shaft and other transmission members, or between transmission members, or between the transmission members and the transmission housing. Each of the family members has the torque-transmitting mechanisms engaged in combinations of two in order to establish at least seven forward speed ratios and one reverse speed ratio within each family member.

It should also be evident that each of the family members has essentially a minimum mechanical content to provide the seven forward speed ratios and one reverse speed ratio. Each family member has only three planetary gearsets and only six torque-transmitting mechanisms.

What is claimed is:

1. A transmissions comprising:
an input shaft;
an output shaft;
a transmission housing;
a first planetary gearset having a first member, a second member, and a third member;
a second planetary gearset having a first member, a second member, and a third member;
a third planetary gearset having a first member, a second member, and a third member;
a first interconnecting member continuously interconnecting said first member of said first planetary gearset with said first member of said second planetary gearset, and said first member of said third planetary gearset;
a second interconnecting member continuously interconnecting said second member of said first planetary gearset with said second member of said second planetary gearset;
said second member of said third planetary gearset being continuously interconnected with said transmission housing;
said output shaft being continuously interconnected with said third member of said first or third planetary gearsets; and
said input shaft being non-continuously interconnected with members of said planetary gearsets;
six selectively engageable torque-transmitting mechanisms operable in combinations of two to establish at least seven forward speed ratios and one reverse speed ratio between said input shaft and said output shaft.

2. The transmission defined in claim 1 further comprising:
each of said first members of each of said first, second, and third planetary gearsets being a member selected from a group consisting of a sun gear member, a ring gear member, and a carrier assembly member;
each of said second members of each of said first, second, and third planetary gearsets being a member selected from a group consisting of a sun gear member, a ring gear member, and a carrier assembly member that is not selected as said first member; and
each of said third members of each of said first, second, and third planetary gearsets being a member selected from a group consisting of a sun gear member, a ring gear member, and a carrier assembly member that is not selected as either said first or second member.

3. A transmission comprising:
an input shaft;
an output shaft;
a transmission housing;
a first planetary gearset having a first member, a second member, and a third member;
a second planetary gearset having a first member, a second member, and a third member;
a third planetary gearset having a first member, a second member, and a third member;
a first interconnecting member continuously interconnecting said first members of each of said planetary gearsets;
a second interconnecting member continuously interconnecting said second member of said first planetary gearset with said second member of said second planetary gearset;
said second member of said third planetary gearset being continuously interconnected with said transmission housing;
said output shaft being continuously interconnected with a member of a group consisting of said third member of said first planetary gearset and said third member of said second planetary gearset;
said input shaft being non-continuously interconnected with members of said planetary gearsets; and
six torque transmitting mechanisms being selectively engaged in combinations of two to establish at least seven forward speed ratios and one reverse speed ratio between said input shaft and said output shaft wherein:
said first of said torque transmitting mechanisms selectively interconnecting said input shaft and said second interconnecting member, said second of said torque transmitting mechanisms selectively interconnecting said input shaft and said third member of said second planetary gear set, said third of said torque transmitting mechanisms selectively interconnecting said input shaft and said third member of said third planetary gear set, said fourth of said torque transmitting mechanisms selectively interconnecting said third member of said second planetary gear set and said third member of said third planetary gear set, said fifth of said torque transmitting mechanisms selectively interconnecting said transmission housing with said second interconnecting member, said sixth of said torque transmitting mechanisms selectively interconnecting said transmission housing and said first interconnecting member, or said first torque transmitting mechanisms selectively interconnecting said input shaft with said second interconnecting member, said second torque transmitting mechanism selectively interconnecting said input shaft with said third member of said first planetary gear set, said third torque transmitting mechanism selectively interconnecting said input shaft with said third member of said third planetary gear set, said fourth torque transmitting mechanisms selectively interconnecting said third member of said first planetary gear set with said third member of said third planetary gear set, said fifth torque transmitting mechanism selectively interconnecting said first interconnecting member with said transmission housing, and said sixth torque transmitting mechanism selectively interconnecting said second interconnecting member with said transmission housing, or said first torque transmitting mechanism selectively interconnecting said input shaft with said second interconnecting member, said second torque transmitting mechanism selectively interconnecting said input shaft with said third member of said first planetary gear set, said third torque transmitting mechanism selectively interconnecting said input shaft with said third member of said third planetary gear set, said fourth torque transmitting mechanism selectively interconnecting said third member of said first planetary gear set with said third member of said third planetary gear, set said fifth torque transmitting mechanism selectively interconnecting said second interconnecting member with said transmission housing, and said sixth torque-transmitting mechanism selectively interconnecting said third member of said third planetary gear set with said transmission housing, or said first torque transmitting mechanism selectively interconnecting said input shaft with said second interconnecting member, said second torque transmitting mechanism selectively interconnecting said input shaft with said third member of said first planetary gear set, said third torque-transmitting mechanism selectively interconnecting said input shaft with said third member of said third planetary gear set, said fourth torque-transmitting mechanism selectively interconnecting said third member of said third planetary gear set with said first interconnecting member, said fifth torque-transmitting mechanism selectively interconnecting said third member of said first planetary gear set with said third member of said third planetary gear set, and said sixth torque-transmitting mechanism selectively interconnecting said second interconnecting member with said transmission housing, or said first torque-transmitting mechanism selectively interconnecting said input shaft with said second interconnecting member, said second torque-transmitting mechanism selectively interconnecting said input shaft with said third member of said second planetary gear set, said third torque-transmitting mechanism selectively interconnecting said input shaft with said third member of said third planetary gear set, said fourth torque-transmitting mechanism selectively interconnecting said transmission housing with said first interconnecting member, and said sixth torque-transmitting mechanism selectively interconnecting said second interconnecting member with said transmission housing, or said first torque-transmitting mechanism selectively interconnecting said input shaft with said second interconnecting member, said second torque-transmitting mechanism selectively interconnecting said input shaft with said third member of said second planetary gear set, said third torque-transmitting mechanism selectively interconnecting said input shaft with said third member of said third planetary gear set, said fourth torque-transmitting mechanism selectively interconnecting said third member of said third planetary gear set with said first interconnecting member, said fifth torque-transmitting mechanism selectively interconnecting said third member of said second planetary gear set and said third member of said third planetary gear set, and said sixth torque-transmitting mechanism selectively interconnecting said transmission housing with said second interconnecting member, or said first torque-transmitting mechanism selectively interconnecting said input shaft with said second interconnecting member, said second torque-transmitting mechanism selectively interconnecting said input shaft with said third member of said second planetary gear set, said third torque-transmitting mechanism selectively interconnecting said input shaft with said third member of said third planetary gear set, said fourth torque-transmitting mechanism selectively interconnecting said third member of said third planetary gear set with said second interconnecting member, said fifth torque-transmitting mechanism selectively interconnecting said first interconnecting member with said transmission housing, and said sixth torque-transmitting mechanism selectively interconnecting said second interconnecting member with said transmission housing, or said first torque-transmitting mechanism selectively interconnecting said input shaft with said second interconnecting member, said second torque-transmitting mechanism selectively interconnecting said input shaft with said third member of said first planetary gear set, said third torque-transmitting mechanism selectively interconnecting said input shaft with said third member of said third planetary gear set, said fourth torque-transmitting mechanism selectively interconnecting said third member of said third planetary gear set with said first interconnecting member, said fifth torque-transmitting mechanism selectively interconnecting said third member of said third planetary gear set with said second interconnecting member, and said sixth torque-transmitting mechanism selectively interconnecting said second interconnecting member with said transmission housing, or said first torque-transmitting mechanism selectively interconnecting said input shaft with said first interconnecting member, said second torque-transmitting mechanism selectively interconnecting said input shaft with said second interconnecting member, said third torque-transmitting mechanism selectively interconnecting said input shaft with said third member of said second planetary gear set, said fourth torque-transmitting mechanism selectively interconnecting said input shaft with said third member of said third planetary gear set, said fifth torque-transmitting mechanism selectively interconnecting said second interconnecting member with said transmission housing, and said sixth torque-transmitting mechanism selectively interconnecting said third member of said third planetary gear set with said transmission housing, or first torque-transmitting mechanism selectively interconnecting said input shaft with said first interconnecting member, said second torque-transmitting mechanism selectively interconnecting said input shaft with said second interconnecting member, said third torque-transmitting mechanism selectively interconnecting said input shaft with said third member of said second planetary gear set, said fourth torque-transmitting mechanism selectively interconnecting said input shaft with said third member of said third planetary gear set, said fifth torque-transmitting mechanism selectively interconnecting said first interconnecting member with said transmission housing, and said sixth torque-transmitting mechanism selectively interconnecting said second interconnecting member with said transmission housing, or said first torque-transmitting mechanism selectively interconnecting said input shaft with said first interconnecting member, said second torque-transmitting mechanism selectively interconnecting said input shaft with said second interconnecting member, said third torque-transmitting mechanism selectively interconnecting said input shaft with said third member of said first planetary gear set, said fourth torque-transmitting mechanism selectively interconnecting said input shaft with said third member of said third planetary gear set, said fifth torque-transmitting mechanism selectively interconnecting said third member of said third planetary gear set with said first interconnecting member, and said sixth torque-transmitting mechanism selectively interconnecting second interconnecting member with said transmission housing, or said first torque-transmitting mechanism selectively interconnecting said input shaft with said second interconnecting member, said second torque-transmitting mechanism selectively interconnecting said input shaft with said third member of said second planetary gear set, said third torque-transmitting mechanism selectively interconnecting said input shaft with said third member of said third planetary gear set, said fourth torque-transmitting mechanism selectively interconnecting said second interconnecting member with said output shaft, said fifth torque-transmitting mechanism selectively interconnecting said first interconnecting member with said transmission housing, said sixth torque-transmitting mechanism selectively interconnecting said second interconnecting member with said transmission housing, or said first torque-transmitting mechanism selectively interconnecting said input shaft with said second interconnecting member, said second torque-transmitting mechanism selectively interconnecting said input shaft with said third member of said first planetary gear set, said third torque-transmitting mechanism selectively interconnecting said input shaft with said third member of said third planetary gear set, said fourth torque-transmitting mechanism selectively interconnecting said third member of said first planetary gear set with said output shaft, said fifth torque-transmitting mechanism selectively interconnecting said second interconnecting member with said transmission housing, and said sixth torque-transmitting mechanism selectively interconnecting said third member of said third planetary gear set with said transmission housing, or said first torque-transmitting mechanism selectively interconnecting said input shaft with said second interconnecting member, said second torque-transmitting mechanism selectively interconnecting said third member of said third planetary gear set with said input shaft, said third torque-transmitting mechanism selectively interconnecting said input shaft with said third member of said third planetary gear set, said fourth torque-transmitting mechanism selectively interconnecting said third member of said third planetary gear set with said first interconnecting member, said fifth torque-transmitting mechanism selectively interconnecting said second interconnecting member with said output shaft, and said sixth torque-transmitting mechanism selectively interconnecting said second interconnecting member with said transmission housing, or said first torque-transmitting mechanism selectively interconnecting said input shaft with said first interconnecting member, said second torque-transmitting mechanism selectively interconnecting said input shaft with said second interconnecting member, said third torque-transmitting mechanism selectively interconnecting said third member of said second planetary gear set with said input shaft, said fourth torque-transmitting mechanism selectively interconnecting said third member of said third planetary gear set with said second interconnecting member, said fifth torque-transmitting mechanism selectively interconnecting said third member of said second planetary gear set with said third member of said third planetary gear set, and said sixth torque-transmitting mechanism selectively interconnecting said second interconnecting member with said transmission housing, or said first torque-transmitting mechanism selectively interconnecting said input shaft with said first interconnecting member, said second torque-transmitting mechanism selectively interconnecting said input shaft with said second interconnecting member, said third torque-transmitting mechanism selectively interconnecting said input shaft with said third member of said third planetary gear set, said fourth torque-transmitting mechanism selectively interconnecting said third member of said third planetary gear set with said output shaft, said fifth torque-transmitting mechanism selectively interconnecting said third member of said second planetary gear set with said third member of said third planetary gear set, and said sixth torque-transmitting mechanism selectively interconnecting said third member of said third planetary gear set with said transmission housing, or said first torque-transmitting mechanism selectively interconnecting said input shaft with said first interconnecting member, said second torque-transmitting mechanism selectively interconnecting said input shaft with said second interconnecting member, said third torque-transmitting mechanism selectively interconnecting said input shaft with said third member of said second planetary gear set, said fourth torque-tansmitting mechanism selectively interconnecting said third member of said third planetary gear set with said first interconnecting member, said fifth torque-transmitting mechanism selectively interconnecting said third member of said third planetary gear set with said output shaft, and said sixth torque-transmitting mechanism selectively interconnecting said third member of said second planetary gear set with said third member of said third planetary gear set.

4. The transmissions defined in claim 3 further comprising:

each of said first members of each of said first, second, and third planetary gearsets being a member selected from a first group consisting of a sun gear member, a ring gear member, and a carrier assembly member;

each of said second members of each of said first, second, and third planetary gearsets being a member selected from a second group consisting of the members of said first group not selected as said first member; and each of said third members of each of said first, second, and third planetary gearsets being a member selected from a third group consisting of a sun gear member, a ring gear member, and a carrier assembly member that is not selected as said first and second member.

* * * * *